United States Patent [19]

Yagoto et al.

[11] Patent Number: 5,801,462
[45] Date of Patent: Sep. 1, 1998

[54] LINEAR MOTOR AND IMAGE READING APPARATUS

[75] Inventors: Mitsutoshi Yagoto; Hideyuki Kurahashi, both of Toyokawa; Masanori Murakami, Toyohashi; Katsuhiro Nanba, Okazaki; Masamitsu Ishiyama; Toshikazu Suzuki, both of Toyokawa, all of Japan

[73] Assignee: Minolta Co., Ltd., Osaka, Japan

[21] Appl. No.: 623,934

[22] Filed: Mar. 28, 1996

[30] Foreign Application Priority Data

Mar. 31, 1995 [JP] Japan ................ 7-075313
Mar. 31, 1995 [JP] Japan ................ 7-076570
Dec. 29, 1995 [JP] Japan ................ 7-353012

[51] Int. Cl.⁶ .................. H04N 1/047; H02K 41/02
[52] U.S. Cl. .................................. 310/12; 318/135
[58] Field of Search ..................... 310/12, 13, 14; 399/208, 211, 212; 318/135

[56] References Cited

U.S. PATENT DOCUMENTS

| | | | |
|---|---|---|---|
| 5,107,157 | 4/1992 | Ito | 310/12 |
| 5,225,725 | 7/1993 | Shiraki et al. | 310/12 |
| 5,229,670 | 7/1993 | Kagawa | 310/12 |
| 5,325,005 | 6/1994 | Denk | 310/686 |
| 5,332,955 | 7/1994 | Hopper | 318/632 |

FOREIGN PATENT DOCUMENTS

| | | | |
|---|---|---|---|
| 53-147219 | 12/1978 | Japan . | |
| 59-121036 | 7/1984 | Japan . | |
| 62-207168 | 9/1987 | Japan . | |
| 2-65656 | 3/1990 | Japan . | |
| 6-225513 | 8/1994 | Japan | 310/14 |
| 2235783 | 3/1991 | United Kingdom | 310/12 |

*Primary Examiner*—Steven L. Stephan
*Assistant Examiner*—Judson H. Jones
*Attorney, Agent, or Firm*—Burns, Doane, Swecker & Mathis, LLP

[57] ABSTRACT

The invention is directed to a linear motor and a image reading apparatus. The motor comprises a rod-like stator formed of a magnetizable rod-like member provided by magnetization with a drive field magnet and a plurality of magnet portions providing multiple kinds of position information; a movable piece being movable along said stator and having an armature coil opposed to said field magnet; and a sensor reading the position information from the plurality of magnet portions. The apparatus includes motors such as the foregoing linear motors as drive source for sliders to be driven for scanning a document image.

22 Claims, 17 Drawing Sheets

LINEAR MOTOR AND IMAGE READING APPARATUS

BACKGROUND OF THE INVENTION

1. Field of the Invention

The present invention relates to a linear motor in which a movable piece having an armature coil is movable along a stator having a drive field-magnet, and also relates to an image reading apparatus employing such a linear motor as a drive source.

2. Description of the Background Art

Linear motors have been widely employed in various kinds of technical fields, and it has been attempted to use the linear motor as a unit for driving, e.g., a document image scanning optical system in an image reading apparatus, e.g., in a copying machine or an image scanner.

An example of an image reading apparatus will be described below. Referring to FIG. 18, a lighting lamp 92 is disposed under a document table glass 91 on which a document is laid. Light emitted from the lamp 92 is reflected by reflection mirrors m1 and m2, and is gathered at an image reading or capturing position 93 on the glass 91. Light reflected by the document is reflected by a mirror m3 and a set of mirrors m4 and m5, and is focused by a lens LN to form an image at a CCD camera 94 which is a linear camera element.

The lamp 92 and mirrors m1, m2 and m3 are mounted on a movable slider C1, and the mirrors m4 and m5 are mounted on a movable slider C2. In the image reading operation, the slider C1 moves to drive the lamp 92 and the mirrors m1, m2 and m3 in a document image sub scanning direction X, and the slider C2 moves to drive the mirrors m4 and m5 in the same direction X. In this operation, the lamp 92 and the mirrors m1, m2 and m3 are driven at a speed, of which ratio to the driving speed of the mirrors m4 and m5 is 2:1. Therefore, no change occurs in a distance from the image reading position 93 to the lens LN, and thus a focused state is maintained. The image formed at the CCD camera 94 is photoelectrically converted to send the same to an unillustrated image processing circuit. In this manner, the reading operation is completed.

The magnification of image reading in the sub scanning direction X can be changed by adjusting the moving speed of the sliders C1 and C2, and the magnification in the main scanning direction perpendicular to the direction x can be changed by electrically processing image data issued from the CCD camera 94.

In the image reading apparatus described above, the sliders C1 and C2 are generally driven by a drive mechanism shown in FIGS. 19(A) and 19(B).

In this drive mechanism, as shown in FIG. 19(A), there is arranged a guide rod 81 extending in the sub scanning direction X, onto which first and second movable pieces 82 and 83 are slidably fitted. An end c11 of the slider C1 is coupled to the first movable piece 82, and an end c14 of the slider C2 is coupled to the second movable piece 83.

A free end c12 of the slider C1 is guided parallel to the guide rod 81 by a roller c13 which is arranged at the free end c12 and rolls on a guide 99. A free end c15 of the slider C2 is guided parallel to the guide rod 81 by a roller c16 which is arranged at the free end c15 and rolls on a guide 99.

Pulleys 841 and 842 are rotatably arranged at fixed positions near the opposite ends of the guide rod 81. Another pulley (corresponding to a running block) 831 is rotatably arranged at a side surface of the second movable piece 83.

As shown in FIG. 19(B), a drive pulley 843 is arranged at a fixed position under and between the pulleys 841 and 842. The drive pulley 843 is rotated by a rotary motor 86 via a belt transmission device 85.

One wire 87 is wound around the drive pulley 843 through an angle larger than 360 degrees. One of the portions of wire 87 extending from the drive pulley 843 is retained around the pulley 841 and the pulley 831 on the second movable piece 83, and is coupled to a spring 88. The spring 88 is coupled to a fixed portion of the apparatus, and is located at a constant position. The other portion of the wire 87 extending from the drive pulley 843 has a portion retained around the other end pulley 842, an intermediate portion coupled to the first movable piece 82, a portion retained around the pulley 831 on the second movable piece 83 and an end coupled to a fixed portion of the apparatus at a position opposed the spring 88.

According to this driving system, when the motor 86 operates to drive and rotate the drive pulley 843, the wire 87 travels, so that the first movable piece 82 coupled thereto moves, and therefore the slider C1 is driven. Also, the second movable piece 83 and therefore the slider C2 are driven at a half speed of the first slider C1.

In the conventional drive system described above, however, many parts such as the belt transmission device, drive pulley, fixed pulleys and wire exist between the motor 86 and the movable pieces 82 and 83, so that the positions of the sliders C1 and C2 are liable to be incorrect and instable due to tolerance, variation in size, expansion/contraction, mounting error and others.

An encoder for sensing a position of the slider is mounted on the rotary motor 86, which operates at a constant speed. In spite of the constant speed of the motor, each of the sliders C1 and C2 may not travel at a constant speed. The position of the slider is determined by counting the number of pulses issued from the encoder associated to the rotary motor 86, which may cause a large error. Home sensors other than the encoder are required for sensing initial positions (home positions) of the sliders C1 and C2.

Meanwhile, linear motors, and particularly linear motors of which movable pieces are movable along a rod-like stator may be employed for driving the sliders C1 and C2 by the movable pieces. In this case, the linear motion of the movable pieces can directly cause the linear motion of the sliders, and the position and others of the sliders can be easily and accurately controlled based on the outputs of the encoders. By the above reason, it has been attempted to utilize the linear motors.

However, in connection with the sliders C1 and C2, it is necessary to drive the slider C1 at double the speed of the slider C2 in the sub scanning direction. It is necessary to prevent collision between the sliders C1 and C2 when they are being set at the home positions during initial setting to be performed upon power-on of the image reading apparatus or the like. Upon completion of the image scanning, the sliders C1 and C2 must start to return from the respective current positions accurately to the predetermined home positions. These operations require complicated control.

By the above reason, a plurality of encoders are required for performing a plurality of kinds of control when the linear motors are utilized for driving the sliders. Therefore, a complicated structure is required by the above and other reasons.

SUMMARY OF THE INVENTION

Accordingly, an object of the invention is to provide a linear motor for driving a driven member, which allows precise control of a position and others of the driven member by a simple structure.

Also, it is an object of the invention to provide an image reading apparatus which has sliders to be driven for scanning a document image, and employs a linear motor as a drive source of the sliders, and in which the operation of the sliders can be controlled precisely with a simple structure, and thereby an image scanning precision is improved.

In order to achieve the above object, the present invention provides a linear motor which includes a rod-like stator formed of a magnetizable rod-like member provided by magnetization with a drive field magnet and a plurality of magnet portions providing multiple kinds of position information; and a movable piece being movable along the stator and having an armature coil opposed to the field magnet and a sensor reading the position information from the plurality of magnet portions.

In order to achieve the above object, the present invention also provides an image reading apparatus which includes a rod-like stator including a magnetizable rod-like member provided by magnetization with a drive field magnet and a plurality of magnet portions providing multiple kinds of position information; first and second movable pieces each being movable along the stator, and each having an armature coil opposed to the field magnet and a sensor for reading the position information from the plurality of magnet portions; a first slider for scanning a document image, which is coupled to the first movable piece; and a second slider coupled to the second movable piece for cooperating with the first slider for scanning the document image.

In the above apparatus, the stator and the first movable piece form a linear motor, and the stator and the second movable piece form another linear motor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
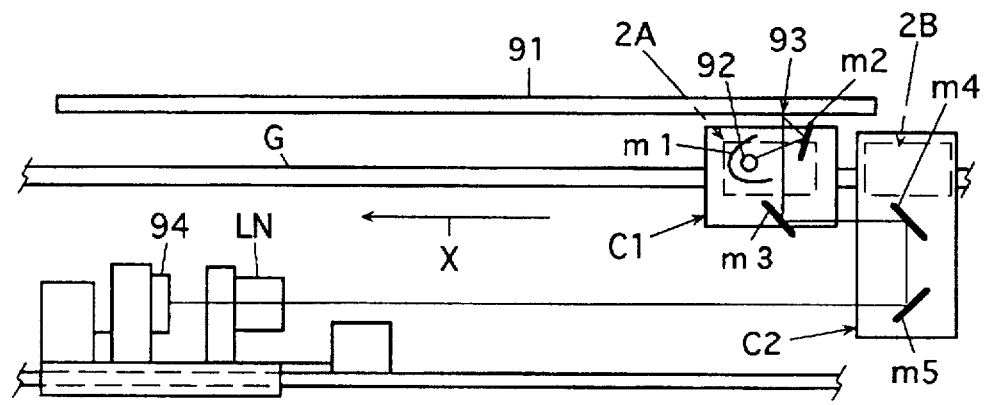
FIG. 1(A) shows a schematic structure of an example of an image reading apparatus provided with a linear motor according to the invention.

Generally, the first slider carries a lamp for lighting a document on a document table and a mirror for reflecting, in a predetermined direction, light coming from the document, and the second slider carries a mirror for reflecting, in a predetermined direction, the light coming from the mirror on the first slider.

In the linear motor according to the invention as well as the linear motor employed in the image reading apparatus according to the invention, the plurality of magnet portions arranged on the stator for controlling the motor operation are usually used for different kinds of control, respectively. Each of the magnet portions may construct an increment encoder, or the plurality of magnet portions may construct an absolute encoder.

Two or more magnet portions may be formed along a longitudinal straight line on the stator. In connection with this, for example, a plurality of magnet portions of different polarities may be arranged along a longitudinal straight line of the stator for controlling the motor operation.

In each of the linear motors in the image forming apparatus described above, the plurality of magnet portions described above on the common stator may be two or more of the following magnet portions, although not restricted to them.

(1) A fine magnet portion for drive control of the first slider.

(2) A fine magnet portion for drive control of the second slider.

(3) A magnet portion for sensing a home position of the first slider.

(4) A magnet portion for sensing a home position of the second slider.

(5) A magnet portion for sensing a return position (e.g., corresponding to each of regular document sizes) of the first slider.

(6) A magnet portion for sensing a return position (e.g., corresponding to each of regular document sizes) of the second slider.

(7) A magnet portion including position information for sensing a document size.

(8) Magnet portions for sensing stop positions of the first and second sliders at the time of shading correction.

(9) Magnet portions for sensing positions of the first and second sliders when the sliders are to be stopped for reading a sheet-through document or a transparent document.

The information reading sensor corresponding to the magnet portion of the above item (1), (3) or (5) is mounted on the first movable piece, and the information reading sensor corresponding to the magnet portion of the above item (2), (4) or (6) is mounted on the second movable piece.

In connection with the magnet portions of the above items (5) and (6), such a structure may be employed that only one of these magnet portions is provided for sensing the return position of one of the first and second sliders, and the return operation of the other slider may be performed in an interlocked manner in accordance with the return operation of the one slider in response to an instruction from a controlling portion which controls the entire operation of the image reading apparatus. In this case, the reading sensor corresponding to one of those of the above items (5) and (6) is not required. The magnet portion for sensing the return position of the first or second slider may be arranged on the same longitudinal straight line of the stator as the magnet portion for sensing the home position of the first or second slider.

In connection with the above item (7), sensing or determination of the document size can be performed, for example, as follows. A sensor for sensing existence/non-existence of the document is mounted on the linear motor for driving the first slider, and only this linear motor is driven. Accordingly, the magnet portion for sensing the document size of the above item (7) may be arranged to indicate the stop position of the movable piece of the linear motor corresponding to each document size. This magnet portion may be arranged on the same straight line as the magnet portions indicating the home position and the return position. In this case, it is preferable that the polarity thereof is opposite to that of the magnet portions indicating the home position and the return position.

With respect to the items (8) and (9), it is necessary to prepare the sensors corresponding to them for both the linear motors for driving the first and second sliders. The magnet portions of the above items (8) and (9) may be arranged on the same straight line, but it is desired that they are arranged on a line different from that for the home position, and/or that the polarity of them is opposite to that of the magnet portion for the home position. These magnet portions may be located at positions opposite to the return position with the home position therebetween.

In the linear motor according to the invention, the movable piece is driven along the stator.

The stator is provided with the plurality of magnet portions formed by magnetization for providing multiple kinds of position information for the control of the motor operation. Also, the movable piece is provided with the sensor for reading the information of the magnet portion. Each magnet portion and the corresponding sensor form the encoder, of which output is used for controlling the operation of the movable piece.

Since the stator is provided with the plurality of magnet portions for the motor operation control, the entire structure of the motor is simplified, and the position information required for the operation of the motor can be easily and accurately derived directly from the magnet portions, which allows precise control of the operation of the movable piece.

According to the image reading apparatus of the invention, the linear motors are utilized for driving the first and second sliders for scanning the document image. Therefore, the entire structure of the apparatus is simplified, and the image scanning can be performed precisely.

As a motor achieving the foregoing object, the invention also provides a linear motor comprising a rod-like stator having a drive field magnet; and a movable piece including an armature coil fitted around the stator, wherein the stator has a stepped portion at the surface of its portion provided with the field magnet, and the movable piece has a sensor disposed near the stepped portion for reading a signal from the stator.

In this linear motor according to the invention, the basic shape of section of the stator may be selected from various shapes such as a triangle, square and ellipse, and is not restricted to a particular shape.

The stepped portion formed at the stator may be considered as a concavity. Therefore, it may have a sectional shape selected from various shapes such as a square, triangular or V-shape, and semicircular or U-shape, or may be a recess having a D-shaped section in a stator of a circular section, as shown in FIGS. 10(A) to 10(D).

In addition to provision of the stepped portion at the stator, any of the foregoing linear motors according to the invention may have the following structure. The sensor formed at the movable piece for reading a signal from the stator, and specifically, the sensor at the movable piece neighboring to the stepped portion at the stator may be a drive sensor, i.e., sensor for driving, which receives a magnetic signal wave from the field magnet, or a sensor receiving a magnetic signal from position information providing means formed at the stepped portion (e.g., a sensor for encoder receiving a magnetic signal from a magnet portion forming a portion of the encoder and formed at the stepped portion). The drive sensor for reading the magnetic signal wave from the field magnet may be typically a Hall element which is a kind of a magneto-electric conversion element, although not restricted to this.

The magnet portion(s) for the encoder formed at the stepped portion may typically be a fine magnet portion, which is provided for forming a magnetic encoder used for sensing, e.g., a moving direction and a moved distance of the movable piece and is formed by arranging N- and S-poles alternately along a longitudinal direction of the stator at a fine pitch (e.g., 50 μm), and may also be other portions such as magnet portions provided for sensing a home position, return position or the like of the movable piece and arranged partially on the stator along a straight line. The sensor for the encoder on the movable piece corresponding to each of these magnet portions may be typically a magnetic sensor of a galvanomagnetic effect type having a good sensitivity and called an MR element or an MR sensor. The above magnet portion may be prepared by using a rod-like member made of a magnetizable and machinable material as the stator, and magnetizing a portion of the member corresponding to the stepped portion formed at the member. Alternatively, a magnet portion formed of an independent film, belt, sheet belt, belt plate, label or the like may be joined to the portion, which corresponds to the stepped portion and is formed at the rod-like member providing the stator, by appropriate means such as adhesive.

In stead of or in addition to the magnetic encoder described above, the linear motor according to the invention may employ an optical encoder. If the optical encoder is employed, the information providing means for providing the position information, which forms a portion of the encoder and can be provided at the stepped portion of the stator, may typically be an optical scale which includes, in an alternately arranged form, two kinds of portions providing different light reflection states (e.g., concavities and convexities providing different light reflection states, two kinds of surfaces having different surface roughnesses and providing different light reflection states, or two kinds of portions painted in dark and light colors). The information providing means may also employ another structure such as light reflecting portions which are arranged at portions of the stator along a straight line for sensing the home position, return position or the like for the movable piece. The sensor for the encoder on the movable piece corresponding to the above optical information providing means may typically be a sensor including a light source and a photocell. The optical information providing means may be formed directly at the stepped portion of the stator, or may be formed independently in a film-belt form, sheet-belt form, a belt-plate form, a label form or the like and may be joined to the stepped portion by appropriate means such as adhesive.

Regardless of the type of the encoder, the linear motor according to the invention may include such a structure that the stepped portion is formed at the stator surface in the field magnet portion of the stator, the drive sensor is opposed to and arranged near the stepped portion, at least one of stepped portions, which are different from the above stepped portion, are formed at the surface of the stator, the position providing means for providing position information for controlling the motor operation is formed at said at least one stepped portion, and the encoder sensor opposed and neighboring to the information providing means for reading information therefrom is mounted on the movable piece.

In this linear motor, the information providing means for providing positional information for the motor operation control arranged at the stepped portion of the stator as well as the corresponding sensor for the encoder on the movable piece may be of either the magnetic type or the optical type described above.

In any of the linear motors according to the invention including the stator provided with the stepped portion, the stepped portion forms a mark, which allows easy assembly and installation to an instrument compared with a similar kind of motor in the prior art. In connection with this, at least a portion of the stepped portion at the stator may serve as an engagement portion engagable with a member for carrying the stator in order to allow further easy and accurate assembly of the motor and installation thereof to the instrument.

In this case, the engagement portion may be employed for various purposes such as positioning and/or rotation-stop for the stator (e.g., for the stator having a circular section) and others depending on the sectional shape of the stator.

The stepped portion at the stator may serve as a guide groove for the movable piece, and the movable piece may be provided with a member which is movable along the stepped portion. This improves the assembly precision of the motor and the mechanical operation precision of the motor.

Figure 10A:
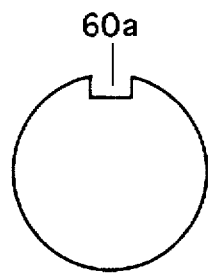
FIGS. 10(A) to 10(D) show examples of stepped portions at a stator in a linear motor according to the invention.
Figure 10B:
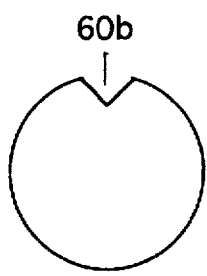
Figure 10C:
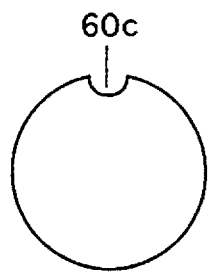
Figure 10D:
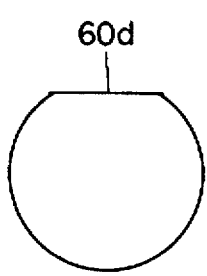

The stepped portion may usually be in a concave groove form, for example, having a section shown in FIGS. 10(A) and 10(B) or FIG. 10(C). A ball-spline mechanism may be formed by the groove and a ball on the movable piece fitted thereto.

In any of the linear motors according to the invention provided with the stepped portion at the stator, the movable piece can be driven along the stator by supplying a current to the armature coil of the movable piece under the control based on the output of the drive sensor which reads a magnetic signal wave from the field magnet.

In the motor of this type, the drive sensor for reading the magnetic signal wave from the field magnet may be opposed closely to the stepped portion at the stator. Alternatively, the information providing means for providing the position information for the motor operation control may be arranged at the stepped portion on the stator, and the sensor for the encoder on the movable piece may be opposed closely to the information providing means. Further alternatively, the drive sensor may be opposed closely to the stepped portion at the stator, and the information providing means for providing the position information for the motor operation control may be arranged at the stepped portion. In these motors, therefore, at least one kind of information used for the motor operation on the stator can be easily and precisely sensed, and further the whole structure can be compact and can have a small size. Further, by using the stepped portion at the stator as a mark, the assembly of motor and the installation thereof to an instrument can be performed easily and precisely.

In the case where at least a portion of the stepped portion at the stator serves as the engagement portion engagable with the carrying member for carrying the stator, the assembly of motor and the installation thereof to an instrument can be performed easily and precisely by using the stepped portion.

In the case where the stepped portion at the stator serves also as the guide groove for the movable piece, and the movable piece is provided with the member which is movable along the stepped portion, this structure improves the motor assembling precision and the mechanical operation precision of the motor.

The linear motor of the type provided with the stepped portion at the stator may be utilized for driving the first and second sliders in the image reading apparatus already described.

In order to achieve the foregoing object, the present invention also provides an image reading apparatus including:

a first slider being reciprocatable and carrying a first mirror reflecting, in a predetermined direction, image light coming from a document;

a second slider being reciprocatable in the same direction as the first slider and carrying a second mirror leading, in a predetermined direction, the image light coming from the first mirror;

a first motor for reciprocating the first slider;

a second motor for reciprocating the second slider;

a first absolute encoder for sensing a current position of the first slider;

a second absolute encoder for sensing a current position of the second slider; and control means for controlling the first and second motors to move the first and second sliders to their initial positions without mutual collision based on the current positions of the sliders sensed by the encoders, respectively, upon start of supply of a power from a power source to the apparatus.

According to this image reading apparatus, when the power is supplied from the power source, each absolute encoder is powered on so that the current absolute position of the slider corresponding to each encoder is sensed prior to the power-on of each motor. Then, the control means operates based on the position information sensed by the encoders, and specifically allows the power-on of the respective motor to move both the sliders to their initial positions while suppressing collision of the sliders with each other.

The number, position and direction of the mirror(s) mounted on the first slider as well as the number, position and direction of the mirror(s) mounted on the second slider can be determined appropriately.

The power-on of the respective encoders prior to the power-on of the respective motors may be executed, for example, simultaneously with the supply of the power to the image reading apparatus from the power source or in response to an instruction from the control means.

The first and second motors may be either the linear motors or the rotary motors.

Each of the absolute encoders may be a magnetic encoder or an optical encoder.

The control means may operate as follows for returning the respective sliders to the initial positions without causing collision with each other. For example, prior to the power-on of the respective motors, the direction and distance which each slider should move are calculated based on the current positions of the sliders sensed by the encoders, and the operation of the respective motors is controlled based on the results of calculation.

In any case, the control means may control the operation of the respective motors in the following manner. When each encoder senses the position of the corresponding slider prior to return of the slider to the initial position, a distance between these sliders is derived from the sensed position information. When the distance is smaller than a predetermined distance (in the case where there is a possibility that both the sliders are in contact with each other, or are excessively close to each other and thus may cause collision), both the sliders are moved apart to set a predetermined distance therebetween, and then both the sliders are moved to the respective initial positions without collision based on the current position information of the sliders supplied from the respective encoders.

In any case, the control means may control the operation of the respective motors as follows. Even when an image reading start instruction switch (e.g., a copy start instruction switch or the like arranged at a control panel of a copying machine if the image reading apparatus is mounted on a copying machine) is turned on, the respective encoders are powered on to sense the current positions of the respective sliders prior to the power-on of the respective motors, and then both the sliders are returned to the initial positions without causing collision with each other based on the sensed current positions.

The image reading apparatus according to the invention may include a lens for focusing light coming from a mirror on the second slider, and an image sensor formed of, e.g., a CCD camera element receiving image light passing through the lens, or may include a lens for focusing image light coming from a mirror on the second slider, and a third mirror for directing the image light passing through the lens toward a photosensitive member. The former image reading apparatus provided with the image sensor may be employed in a digital copying machine, and the latter may be employed in an analog copying machine.

As an embodiment of the invention, an example of an image reading apparatus utilizing a linear motor according to the invention will be described below with reference to the drawings.

Figure 1B:
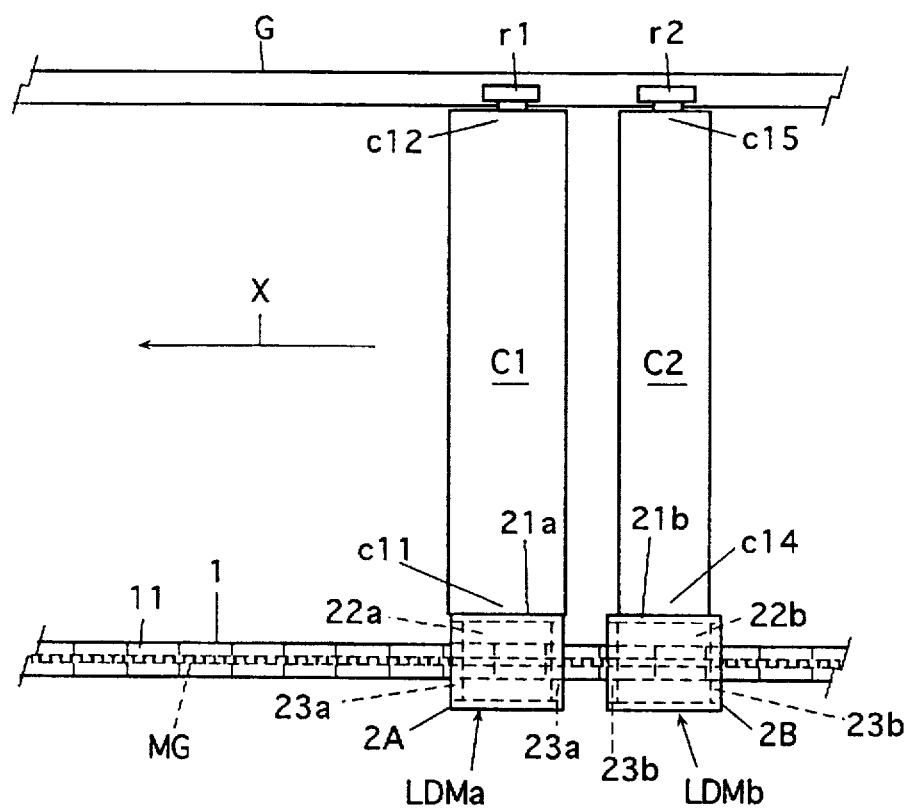
FIG. 1(B) is a plan of a slider driving portion in the apparatus in FIG. 1(A)

FIG. 1(A) shows a schematic structure of an example of an image reading apparatus utilizing an example of a linear motor according to the invention. FIG. 1(B) is a plan of a slider drive portion of a document image scanning optical system in the apparatus in FIG. 1(A). In FIG. 1(A), linear motors in the slider driving portion are shown by chain line representing only positions of movable pieces 2A and 2B.

In this image reading apparatus, a linear motor LDMa is employed for driving a first slider C1 carrying a document lighting lamp 92 and mirrors m1, m2 and m3 to be moved therewith for document scanning, and a linear motor LDMb is employed for driving a second slider C2 carrying mirrors m4 and m4 which cooperate with the lamp 92 and the mirrors m1, m2 and m3 to scan the image.

Figure 18:
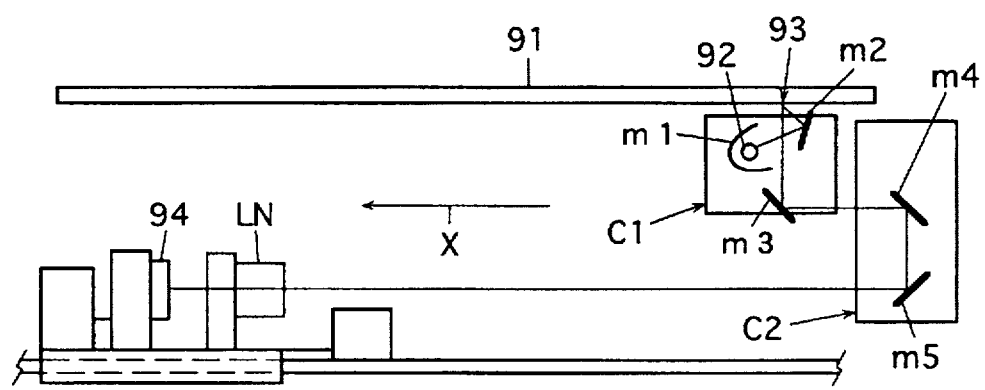
FIG. 18 shows a schematic structure of an example of an image reading apparatus in the prior art.
Figure 19A:
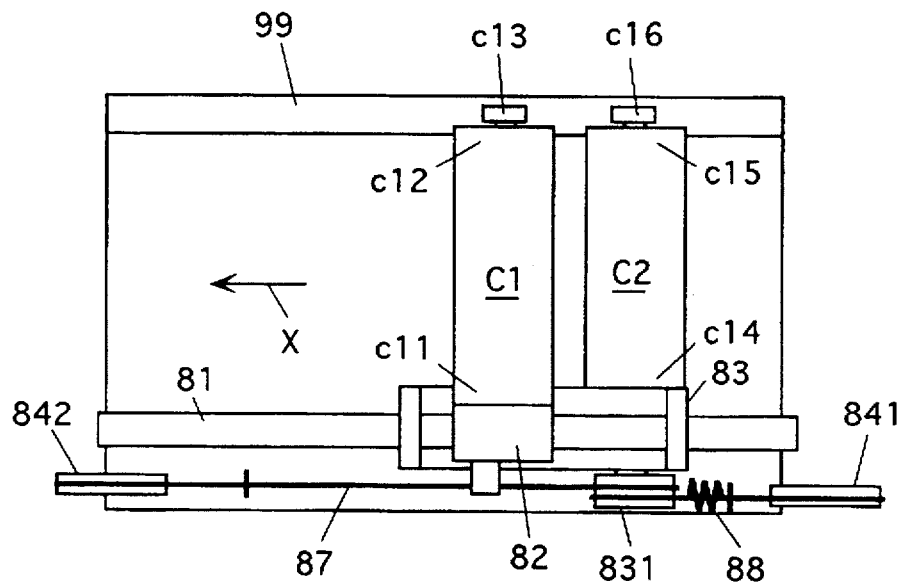
FIG. 19(A) shows a plan of a driving portion for an image scanning optical system in the apparatus shown in FIG. 18.
Figure 19B:
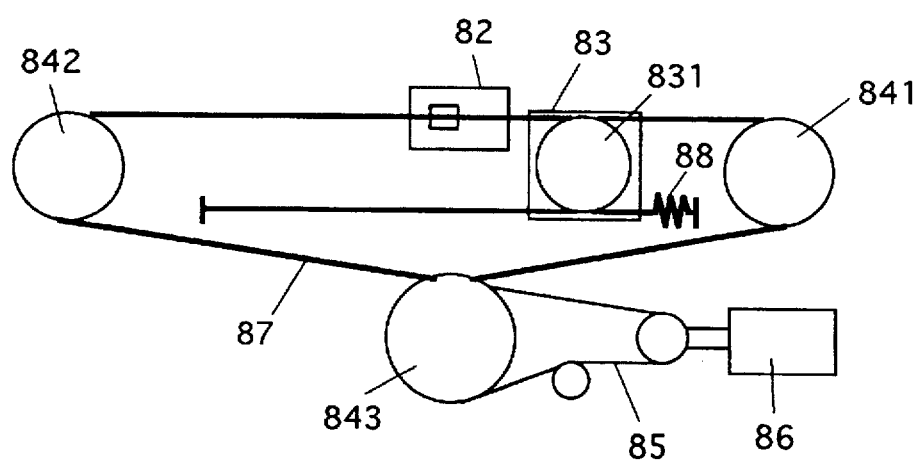
FIG. 19(B) is a side view of the driving portion.

Structures other than the above are basically the same as those of the image reading apparatus in the prior art shown in FIG. 18, and the same portions and parts as those in FIG. 18 bear the same reference numbers. These portions and parts operate similarly to those in the apparatus in FIG. 18.

In the image reading apparatus shown in FIGS. 1(A) and 1(B), the linear motor LDMa driving the slider C1 is formed of a straight rod-like stator 1, and a movable piece 2A fitted around and guided by the stator. The slider C1 has an end c11 coupled to the movable piece 2A, and a free end c12 thereof is provided with a roller r1 which is disposed on a guide rail G parallel to the stator 1 for allowing travel of the slider.

The linear motor LDMb driving the slider C2 is formed of the stator 1, and a movable piece 2b fitted around and guided by the stator. The slider C2 has an end c14 coupled to the movable piece 2B, and a free end c15 thereof is provided with a roller r2 which is disposed on the guide rail G for allowing travel of the slider.

Figure 2A:
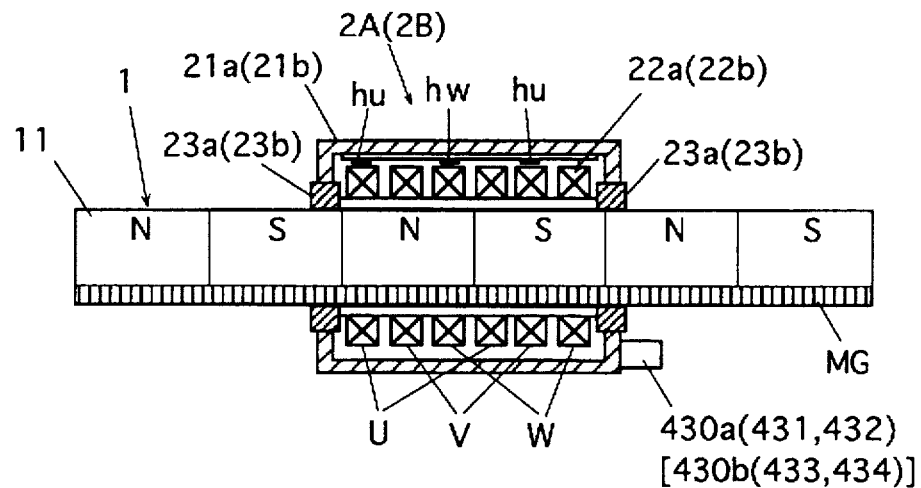
FIG. 2(A) is a cross section of the linear motor shown in FIG. 1(B)
Figure 2B:
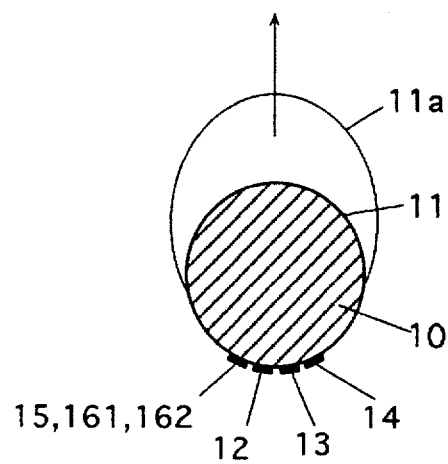
FIG. 2(B) shows a magnetic force distribution of a field magnet in a stator of the linear motor portion and positional state thereof with respect to other magnet portions.
Figure 2C:
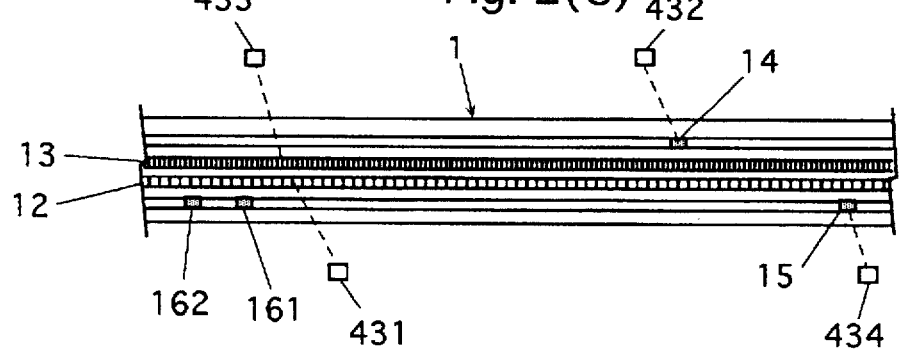
FIG. 2(C) shows magnet portions other than the field magnet in the stator and sensors corresponding to the same.

The stator 1 is formed of a rod-like member 10 of a circular section, which is made of a machinable and magnetizable material and is magnetized in a later step to form several kinds of magnets as shown in FIGS. 1(B), 2(A) and 2(B). These magnet portions are as follows. In FIGS. 1(B) and 2(A), magnet portions other than the field magnet 11 are generally indicated by a reference MG. Specific structures of them are shown in FIGS. 2(B) and 2(C).

(1) A field magnet 11 for driving the movable piece provided with N- and S-poles arranged alternately in a secondary scanning direction X.

(2) A fine magnet portion 12 used for controlling drive (speed in this embodiment) of the first slider C1 and provided with N- and S- poles arranged alternately in the sub scanning direction X at a fine pitch.

(3) A fine magnet portion 13 used for controlling drive (speed in this embodiment) of the second slider C2 and provided with N- and S-poles arranged alternately in the sub scanning direction X at a half pitch of that of the magnet portion 12.

(4) An absolute magnet portion 14 for sensing a home position of the first slider C1.

(5) An absolute magnet portion 15 for sensing a home position of the second slider C2.

(6) Magnet portions 161 and 162 for sensing return positions of the second slider C2 corresponding to regular document sizes. In this embodiment, polarities of the magnet portions 161 and 162 are the same as that of the magnet portion 15. The magnet portions 161 and 162 are arranged on the same straight line as the magnet portion 15.

The field magnet 11 is prepared by magnetization to provide a distribution of a magnetic flux density having a sinusoidal wave form in which N- and S-poles define one cycle. As shown in FIG. 2(B), in order to avoid such a situation that the magnet 11 adversely affects other portions such as the magnet portion 12 to disable accurate reading, such a magnetic force distribution 11a is set that a bottom side portion (viewed in the section of the stator 1) of the rod-like member 10 at which the magnet portion 12 and others are arranged is adapted to produce a weak or substantially no magnetic force, and the opposite portion can produce a predetermined sufficiently large magnetic force.

In any case, it is preferable that the field magnet exhibits such a magnetic force distribution that the portion in the stator provided with the magnet portion MG produces only a weak or substantially no magnetic force.

Each of the fine magnet portions 12 and 13 for controlling drive of the first and second sliders is also formed by magnetization to provide a distribution of magnetic flux density of a sinusoidal wave form in which N- and S-poles define one cycle.

The movable pieces 2A and 2B of the linear motors LDMa and LDMb have the same basic structure, and each of them includes a cylindrical movable piece yoke 21a (21b) and a generally cylindrical armature coil 22a (22b) accommodated in and carried by the yoke, as shown in FIGS. 1(B) and 2(A). The armature coil 22a (22b) is fitted around the stator 1 with a predetermined space therebetween. The movable piece yoke 21a (21b) is provided at its opposite ends with bearings 23a (23b), through which the movable piece 2A (2B) can be guided by the stator 1 for travel.

Each of the armature coils 22a and 22b in the movable piece 2A and 2B is formed of three-phase coils u, v and w shifted from each other by an electrical angle of 2π/3 (or arranged at the same positions as those shifted by 2π/3). The movable piece 2A (2B) is provided with position sensing elements. The position sensing element in this embodiment senses a magnitude and a direction of the magnetic flux of the field magnet 11 at the position thereof, and is formed of a Hall element hu, hv or hw which is a kind of magneto-electric converting element. The Hall element hu is arranged for the coil u. Similarly, the elements hv and hw are arranged for the coils v and W, respectively. The movable piece 2A (2B) is driven by supplying a current of a magnitude and a direction corresponding to the magnitude and direction of the magnetic flux sensed by the Hall elements.

As shown in FIGS. 2(A) and 2(C), the movable piece 2A is provided with a magnetic sensor 431 corresponding to the fine magnet portion 12 for controlling drive of the first slider C1, and a magnetic sensor 432 corresponding to the magnet portion 14 for sensing the home position of the first slider C1. These sensors are carried by a sensor holder 430a arranged at the movable piece yoke 21a. The movable piece 2B is provided with a magnetic sensor 433 corresponding to the fine magnet portion 13 for controlling drive of the second slider C2, and a magnetic sensor 434 corresponding to the magnet portion 15 for sensing the home position of the second slider C2 and also corresponding to the magnet portions 161 and 162 provided for sensing the return positions of the second slider C2 corresponding to the regular document sizes. These sensors are carried by a sensor holder 430b arranged at the movable piece yoke 21b.

These magnetic sensors are magnetic resistance elements of a galvanomagnetic effect type called an MR element, and have a high sensitivity.

In accordance with the above structure, a current is supplied to the armature coil 22a (22b) under the control based on the outputs from the Hall elements hu, hv and hw, so that a drive force for the movable piece 2A (2B) is generated, whereby the movable piece 2A (2B) moves along the stator 1. Thereby, the slider C1 (C2) is driven at its one side, and the scanning optical system members such as the lamp 92 and the mirrors m1–m5 carried thereby are move in the sub scanning direction X. In this manner, the document image is scanned and read. During the scanning, the movable piece 2A is driven at double the speed of the movable piece 2B.

Figure 3A:
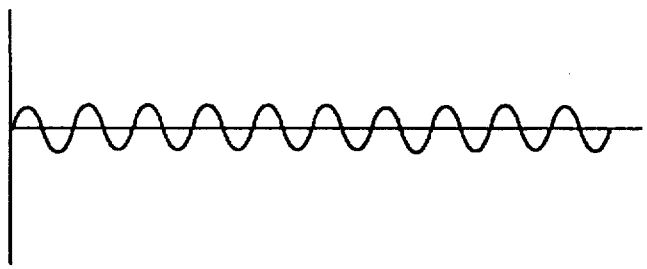
FIG. 3(A) shows an example of a state of a magnetic signal wave from a fine magnet portion for speed control of a movable piece in a stator of a linear motor.

The movable pieces 2A and 2B, and thus sliders C1 and C2 are driven at constant speeds, as will be described later. In this operation, the speed of the slider C1 is controlled based on a magnetic signal wave (i.e., continuous signal wave of which one cycle is defined by N- and S-poles as shown in FIG. 3(A)) read by the magnetic sensor 431 on the movable piece 2A from the fine magnet portion 12 for drive control on the stator 1. The speed of the slider C2 is controlled based on a magnetic signal wave (i.e., continuous signal wave as shown in FIG. 3(A)) read by the magnetic sensor 433 on the movable piece 2B from the fine magnet portion 13 for drive control on the stator 1.

When each of the movable pieces 2A and 2B reaches the return position corresponding to the document size, the magnetic sensor 434 on the movable piece 2B senses the magnet portion 161 or 162, and the movable pieces 2A and 2B, and thus the sliders C1 and C2 start returning in response to an instruction issued from a controller (particularly, a computer) in the image reading apparatus based on the output of the magnetic sensor 434. In this manner, the movable pieces 2A and 2B return to and stop at the home positions. The sensing of the arrival at the home positions is performed as follows. The arrival of the slider C1 is sensed by sensing the magnet portion 14 indicating the home position by the magnetic sensor 432 on the movable piece 2A. The arrival of the slider C2 is sensed by sensing the magnet portion 15 indicating the home position by the magnetic sensor 434 on the movable piece 2B. The movable pieces 2A and 2B, and thus the sliders C1 and C2 stop in accordance with the instruction sent from the controller (particularly, the computer) in the image reading apparatus based on the sensor output.

Figure 3B:
FIG. 3(B) shows an example of a state of a signal from an absolute magnet portion on the stator.

The signals sensed from the magnet portions 161, 162, 14 and 15 are in a pulse form as exemplified in FIG. 3(B).

The operation control of the linear motor LDMa (LDMb) will be described below further in detail.

As already described, the field magnet 11 of the stator 1 is magnetized to provide the magnetic flux distribution of a sinusoidal wave of which one cycle is defined by N- and S-poles. Also, as described before, the armature coil 22a (22b) of the movable piece 2A (2B) is formed of the three-phase coils u, v and w arranged at the positions shifted by an electrical angle of 2π/3 or arranged at the same positions as those shifted by 2π/3. Each coil is associated with the Hall element hu, hv or hw for sensing a magnitude and a direction of the magnetic flux of the magnet 11 at the position thereof. The motor LDMa (LDMb) is driven by supplying a current corresponding to the magnitude and direction of the magnetic flux sensed by these Hall elements. Thus, a so-called three-phase driving manner is employed, and signals of phases shifted by 120 degrees from each other are supplied to the coils, whereby a constant driving force can be obtained regardless of the position of the movable piece. In this embodiment, the three-phase driving method is employed, and, for driving the movable piece at an intended speed, a phase-locked -loop servocontrol method, which is generally called a PLL, is employed.

Figure 4A:
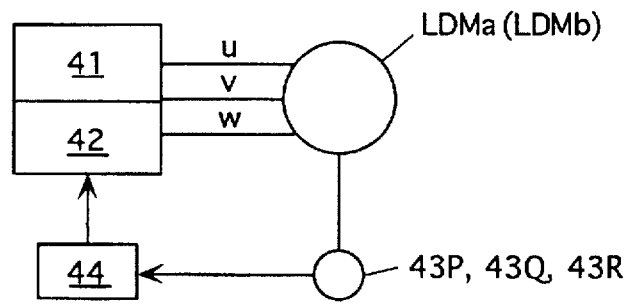
FIG. 4(A) is a schematic block diagram showing an operation control circuit of the linear motor.
Figure 4B:
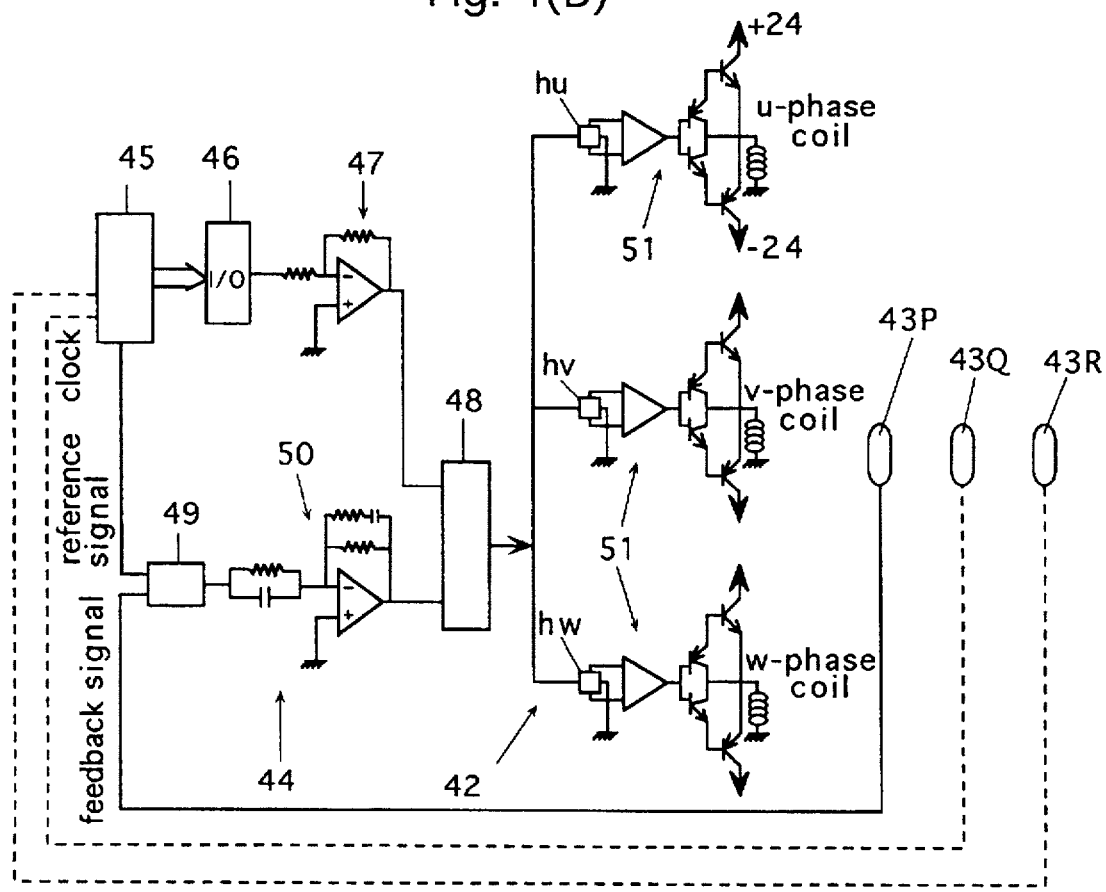
FIG. 4(B) shows a major portion of the operation control circuit including a speed control circuit of a phase-locked-loop servocontrol type.

FIG. 4(A) is a schematic block diagram showing an electric circuit for operation control of the motor LDMa (LDMb), and FIG. 4(B) shows a major portion of the operation control circuit including a speed control circuit of the phase synchronous control type. Since the control circuits for the motors LDMa and LDMb have the same structure, only one of them is specifically represented in FIGS. 4(A) and 4(B). However, a DC power source 41 shown in FIG. 4(A) and a computer 45 shown in FIG. 4(B) are commonly used by both the motors.

In FIGS. 4(A) and 4(B), 41 indicates a DC power source, 42 indicates a current supply control circuit including the Hall elements and others, 43P indicates an encoder sensing the moving speed of the movable piece 2A (2B), 43Q indicates an encoder sensing a home position of the movable piece 2A, 43R indicates an encoder sensing a return position of the movable piece 2A (2B) and a home position of the movable piece 2B, and 44 indicates an circuit including a speed controller of the phase-locked-loop servocontrol type.

As shown in FIG. 2(C), the encoder 43P is formed of the magnet portion 12 and the sensor 431 with respect to the movable piece 2A, as well as the magnet portion 13 and the sensor 433 with respect to the movable piece 2B. The encoder 43Q is formed of the magnet portion 14 and the sensor 432. The encoder 43R is formed of the magnet portions 161, 162 and 15, and the sensor 434.

In FIG. 4(B), 45 indicates the computer which instructs predetermined operations of the motor LDMa (LDMb) for image reading and issues a reference clock signal to a phase synchronous controller 49. 46 indicates an I/O port of the computer 45, 47 indicates an amplifier, 48 indicates a switch portion, 49 indicates the phase synchronous controller, 50 indicates a compensation circuit, and 51 indicates an amplifier circuit.

According to the control circuit shown in FIGS. 4(A) and 4(B), the computer 45 issues the reference clock signal corresponding to an intended speed to the phase synchronous controller 49, and the encoder 43P feeds back a moving speed signal of the movable piece 2A (2B) to the controller 49. The phase synchronous controller 49 issues a signal, which corresponds to a frequency difference and a phase difference between the pulse of the reference clock and the pulse of the feedback signal sent from the encoder 43P, so that the compensating circuit 50 compensates a gain or delay in the transmission system, and the output voltage thereof is used as a reference input voltage of the Hall elements. The Hall element issues the voltage corresponding to the magnitude and direction of the magnetic flux at the position thereof, and the output voltage has such a characteristic that it is proportional to the reference input voltage. Therefore, the Hall element issues the output voltage corresponding to the difference between the reference clock signal and the feedback signal. The output voltage issued from the Hall element is proportionally amplified by the amplifier circuit 51, and is supplied to the armature coil. In this manner, the feedback signal can have the pulse of the same frequency and phase as the pulse of the reference clock signal. In other words, the motor LDMa (LDMb) can be driven to attain the intended speed of the movable piece 2A (2B).

In accordance with the instruction issued from the computer 45 based on the signal sent from the encoder 43R, the movable piece 2A (2B) starts returning at the return position. Both the movable pieces 2A and 2B stop at the home positions in accordance with the instruction issued from the computer 45 based on the home position sensing signals sent from the encoders 43Q and 43R.

The linear motors LDMa and LDMb described above can operate to guide and move the movable piece 2A and 2B along the stator 1, respectively. The plurality of magnet portions 12, 13, 14, 15, 161 and 162 are formed by magnetization at the stator 1 for providing multiple kinds of position information for the operation control of the motors. Further, the movable pieces 2A and 2B are provided with the read sensors 431–434 corresponding to these magnet portions. Therefore, each motor can have a simple and compact structure. Also, the position information required for the motor operation can be easily and accurately derived directly from the magnet portions, so that the operation of the movable pieces 2A and 2B can be controlled precisely.

In the image reading apparatus, since the linear motors described above are used to drive the sliders C1 and C2 in the scanning optical system for the document image, the whole apparatus can have the simple and compact structure, and can scan the image precisely.

Linear motors of another type according to the invention will be described below. Linear motors which will be described below with reference to FIGS. 5(A) to 9 will be generally indicated by LDM.

Figure 5A:
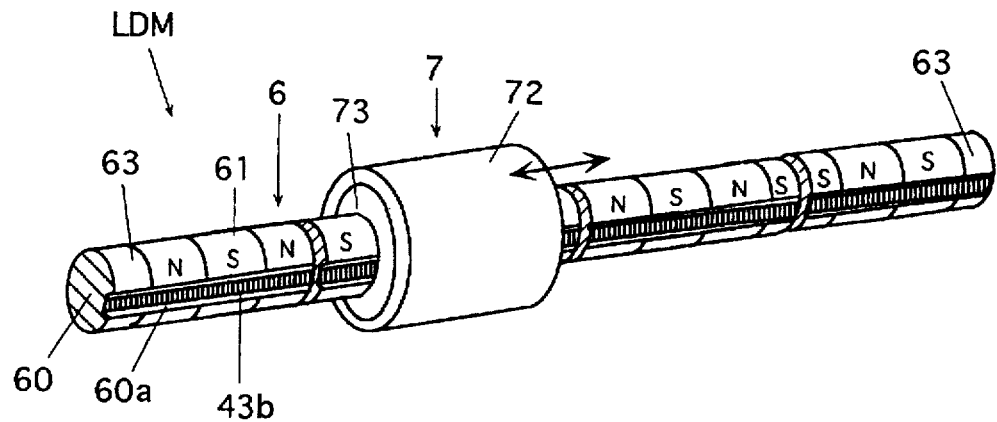
FIG. 5(A) is a perspective view of another example of a linear motor according to the invention.
Figure 5B:
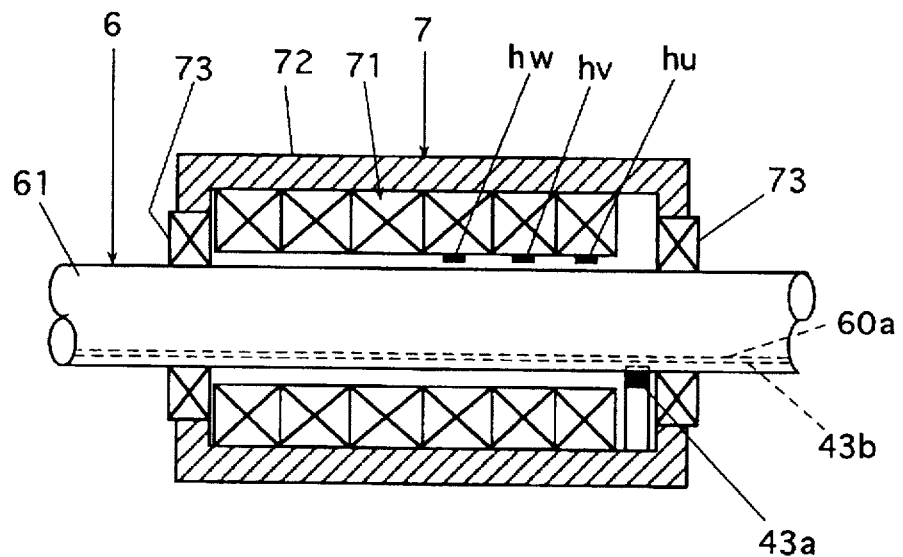
FIG. 5(B) is a cross section of the motor taken along a horizontal plane containing an axial line in a longitudinal direction of a stator.

FIG. 5(A) is a perspective view of the linear motor LDM, and FIG. 5(B) is a cross section of the same.

In the linear motor LDM, a movable piece 7 can reciprocate along a stator 6 which is formed of a straight rod-like member 60 having a circular section and made of a machinable and magnetizable material.

The stator 6 is provided at its surface with a drive field magnet 61 formed by magnetization to arrange N- and S-poles alternately at a pitch of 60 mm, and further includes a stepped portion 60a which is in a concave groove form having a square section and extends in the longitudinal direction of the stator. At the bottom of this stepped portion 60a, a fine magnet portion 43b is formed by magnetization to form a portion of a magnetic encoder which is used for speed control of the movable piece 7. The fine magnet portion 43b includes N- and S-poles alternately arranged at a pitch of 50 μm.

Figure 9:
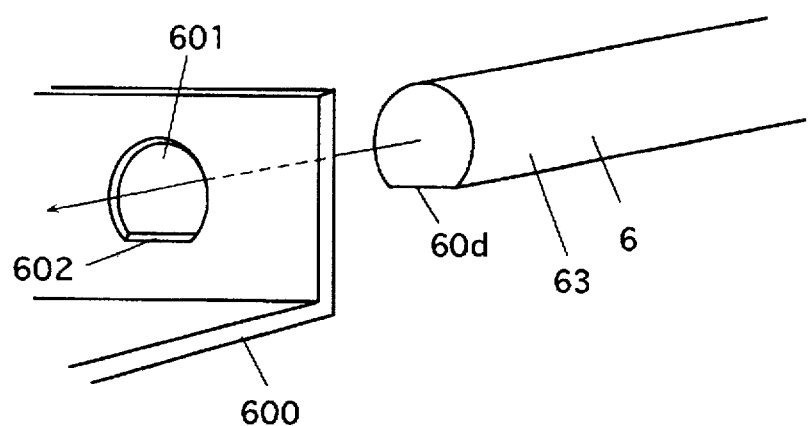
FIG. 9 shows a state of arranging a stator carrying member in an instrument for installing the motor stator shown in FIGS. 7 and 8 to the member.

Opposite ends 63 of the stator 6 are inserted into holes, which are formed at stator carrying members in an instrument such as an image reading apparatus as exemplified in FIG. 9 and to be described later in connection with still another example of a motor, and thereby are carried at a constant position and an angle.

The movable piece 7 includes an armature coil 71 formed of a plurality of annular coils fitted around the stator 6 with a space therebetween. The armature coil 71 is carried inside a cylindrical movable piece yoke 72. The movable piece yoke 72 is provided at its opposite ends with bearings 73, through which the movable piece 7 is guided by the stator 6 for movement.

The armature coil 71 of the movable piece 7 is formed of three-phase coils u, v and w arranged at the positions shifted by an electrical angle of 2π/3 or arranged at the same positions as those shifted by 2π/3. The Hall element hu, which is a kind of a magneto-electric conversion element, is arranged for the u-phase coil. Similarly, the Hall elements hv and hw are arranged for the v-phase and w-phase coils, respectively. These Hall elements are opposed to the field magnet 61. The movable piece yoke 72 is provided in a compact manner with a magnetic sensor 43a (a sensor formed of a magnetic resistance element called an MR element in this embodiment) which is opposed to the fine magnet portion 43b at the bottom of the stepped portion 60a. At least a portion of the magnetic sensor 43a is fitted into the stepped portion 60a, and is disposed near the fine magnet portion 43b.

Figure 6A:
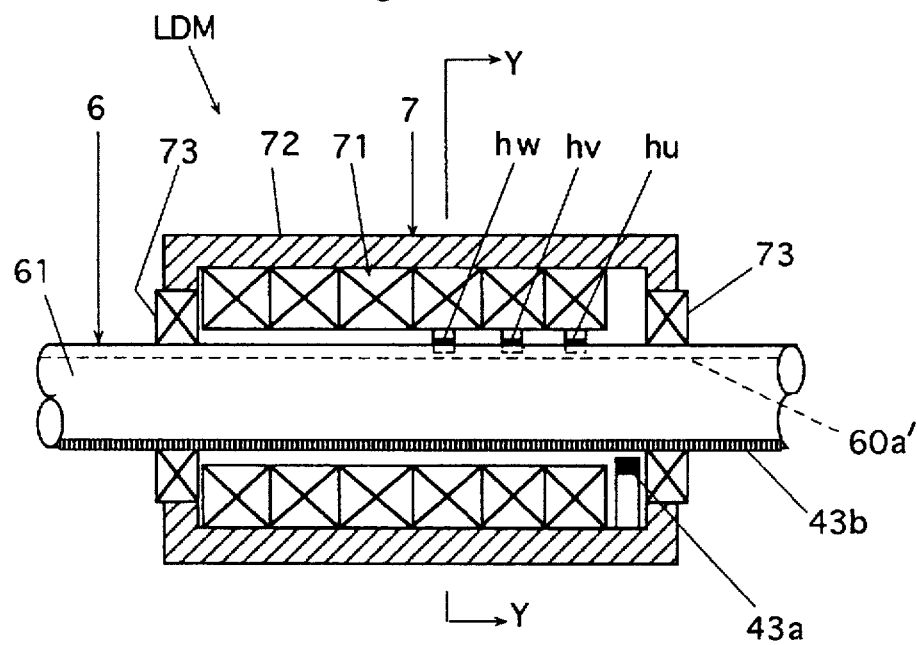
FIG. 6(A) is a cross section of still another example of a linear motor according to the invention taken along a horizontal plane containing an axial line in a longitudinal direction of a stator.
Figure 6B:
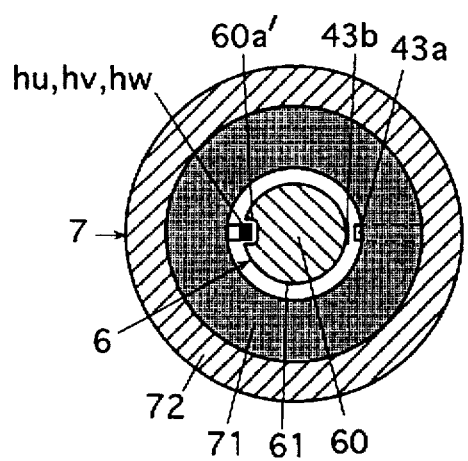
FIG. 6(B) is a cross section of the motor taken along line Y—Y in FIG. 6(A)

Still another example of a linear motor LDM will be described below. FIG. 6(A) is a cross section taken along a horizontal plane containing an axial line of the motor in the longitudinal direction of the stator. FIG. 6(B) is a cross section taken along line Y—Y in FIG. 6(A).

The linear motor LDM is similar to that shown in FIGS. 5(A) and 5(B) except for the following structures. A stepped portion 60a' in a concave groove form having a square section is formed at the surface of the field magnet portion 61 of the stator 6. Each of the Hall elements hu, hv and hw has at least a portion fitted into the stepped portion. The fine magnet portion 43b is formed by magnetizing at a surface portion of the stator other than the stepped portion, and a magnetic sensor 43a is opposed thereto. Each Hall element is sufficiently close to the field magnet 61 owing to the above state, so that magnetic information can be surely sensed therefrom. Structures other than the above are the same as those shown in FIGS. 5(A) and 5(B), and the same or similar portions and parts bear the same reference numbers as those in the motor shown in FIGS. 5(A) and 5(B).

Figure 7:
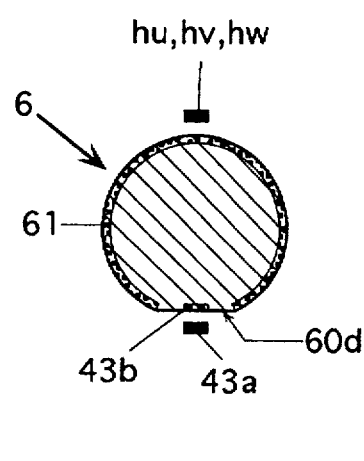
FIG. 7 shows a section of a stator of yet another example of a motor according to the invention together with sensors opposed thereto.

FIG. 7 shows a section of the stator 6 of yet another linear motor LDM together with sensors opposed thereto.

In this linear motor, the stator 6 is provided at its surface with a stepped portion 60d which is defined by a recess of a D-shaped section. The fine magnet portion 43b is formed by magnetization at the stepped portion 60d. The field magnet 61 is-formed at an area except for this stepped portion 60d. The Hall elements hu, hv and hw are opposed to the portion of the field magnet 61. The magnetic sensor 43a is opposed to the fine magnet portion 43b, and is sufficiently close thereto. Structures other than the above are the same as those of the linear motor shown in FIGS. 5(A) and 5(B).

Figure 8:
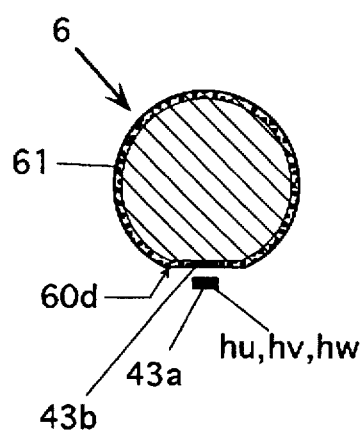
FIG. 8 shows a section of a stator of further another example of a motor together with sensors opposed thereto.

FIG. 8 shows a section of the stator 6 of further another linear motor LDM together with sensors opposed thereto.

In this linear motor, the stator 6 is similarly provided at its surface with the stepped portion 60d which is defined by a recess of a D-shaped section, and the fine magnet portion 43b is formed at the stepped portion. However, the field magnet 61 is also formed at the stepped portion 60d, and the fine magnet portion 43b is formed over the field magnet 61. The Hall elements hu, hv and hw are sufficiently close to this stepped portion of the field magnet 61 in an opposed fashion, and the magnetic sensor 43a is sufficiently close to the fine magnet portion 43b in an opposed fashion. Structures other than the above are the same as those of the linear motor shown in FIGS. 5(A) and 5(B).

In the linear motors including the stators 6 and sensors shown in FIGS. 7 and 8, the stepped portion 60d at the stator 6 also serves as an engagement portion for a stator carrying member of an instrument such as an image reading apparatus. More specifically, as shown in FIG. 9, a stator carrying member 600 at the instrument is provided with a hole 601 which has a configuration similar to the section of the stator 6. The stator 6 is inserted into the hole 601 to engage the stepped portion 60d with a straight edge 602 of the hole 601. Thereby, the stepped portion 60d can be utilized as the engagement portion for stopping rotation of the stator 6 and positioning the same.

In each of the motors shown in FIGS. 5(A) and 6(A), the stepped portion 60a or 60a' of the stator 6 can be utilized as an engagement portion similar to the above. In this case, the hole or concavity at the stator carrying member for inserting the stator thereinto has a configuration allowing close fitting or engagement with the stepped portion.

By utilizing the stepped portion of the stator 6 also as the engagement portion, the motor can be assembled and installed to the instrument more easily and accurately.

The configuration of the stepped portion at the stator 6 of the linear motor described above is not restricted to those already described. For example, as shown in FIGS. 10(A) to 10(D), the stator 6 may employ a portion 60a of a square section, a portion 60b of a triangular or V-shaped section, a portion 60c of a semicircular or U-shaped section or a portion 60d defined by a recess of a D-shaped section formed at the stator of a circular section.

Although not shown, the movable piece 7 may be provided with a member such as a ball, which is fitted into the concave or grooved stepped portion shown in FIGS. 10(A) to 10(C) and is movable along the stepped portion. This structure improves the assembly precision and the mechanical operation precision of the motor.

In any of the linear motors LDM described above, the movable piece 7 can be moved along the stator 6 by supplying a current to the armature coil 71 under the control of the outputs of the Hall elements hu, hv and hw. Also, the speed of the movable piece 7 can be controlled based on the output of the magnetic sensor 43a.

In the linear motor LDM shown in FIGS. 5(A) and 5(B) as well as the linear motors employing the stators 6 shown in FIGS. 7 and 8, the fine magnet portion 43b is formed at the stepped portion 60a or 60d at the stator 6, and the magnetic sensor 43a is sufficiently close to the fine magnet portion 43b, so that the magnetic sensor can easily and precisely sense the magnetic signal from the fine magnet portion 43b. Further, owing to the close arrangement of the magnetic sensor 43a with respect to the stepped portion 60a or 60d, the whole structure can be compact and small in size.

In the linear motor LDM shown in FIGS. 6(A) and 6(B) as well as the linear motor employing the stator 6 shown in FIG. 8, the Hall elements hu, hv and hw are sufficiently close to the stepped portion 60a' or 60d at the stator 6, so that the Hall elements can easily and precisely sense the magnetic signal from the field magnet 61. Further, owing to the close arrangement of the Hall elements with respect to the stepped portion 60a' or 60d, the whole structure can be compact and small.

In the linear motor employing the stator 6 as well as the Hall elements hu, hv and hw and the magnetic sensor 43a arranged as shown in FIG. 8, the Hall elements hu, hv and hw as well as the magnetic sensor 43a are opposed closely to the stepped portion 60d. Therefore, the magnetic sensor and the Hall elements can easily and precisely sense the magnetic signal, and the whole structure can be further compact and small.

In any of the linear motors LDM described above, the stepped portion 60a, 60a' or 60d at the stator 6 can be utilized as a mark, so that assembly of the motor and installation thereof to an instrument can be performed easily and precisely.

If the surface of the stator were flat, it would be impossible to find the position of the fine magnet portion. Meanwhile, in the structure in which the fine magnet portion is formed at the stepped portion, the position of the fine magnet portion can be found easily. Therefore, it is possible to prevent destruction of the fine magnet during assembly, which may be caused, e.g., by contact of a tool with the fine magnet portion. Further, the positioning of the magnetic sensor for sensing the fine magnet can be performed easily.

Figure 11A:
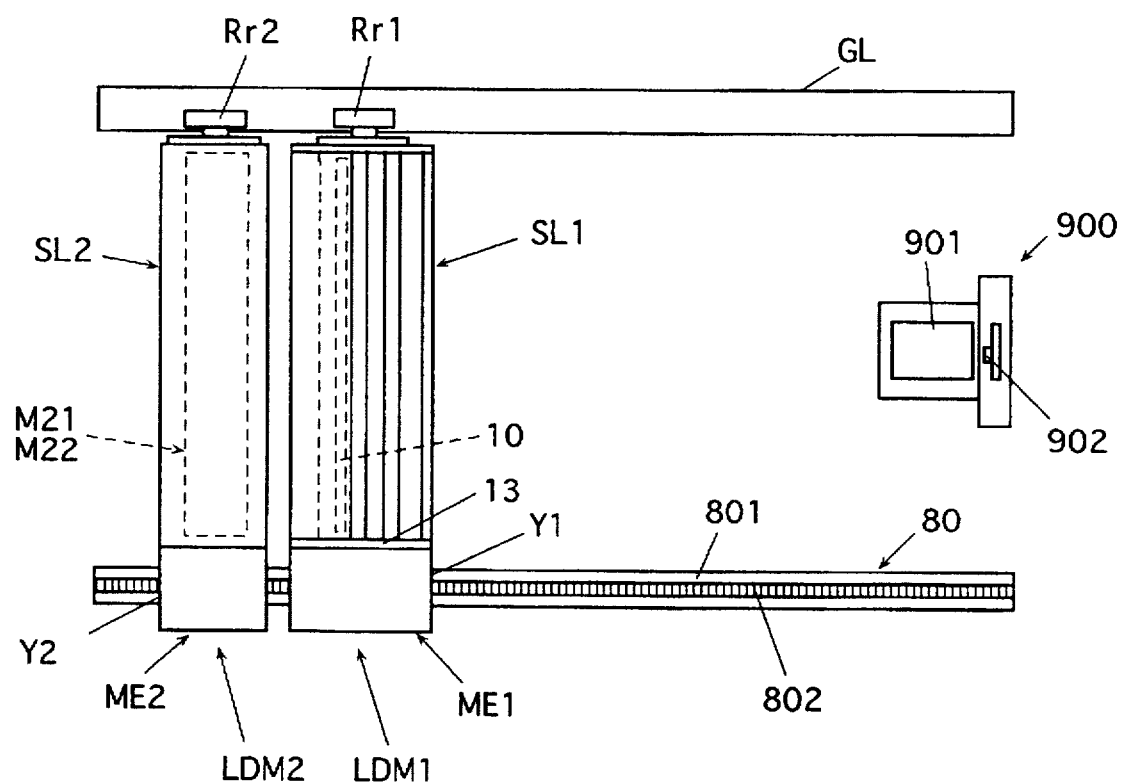
FIG. 11(A) is a schematic plan of an image reading apparatus according to the invention arranged in a digital copying machine.
Figure 11B:
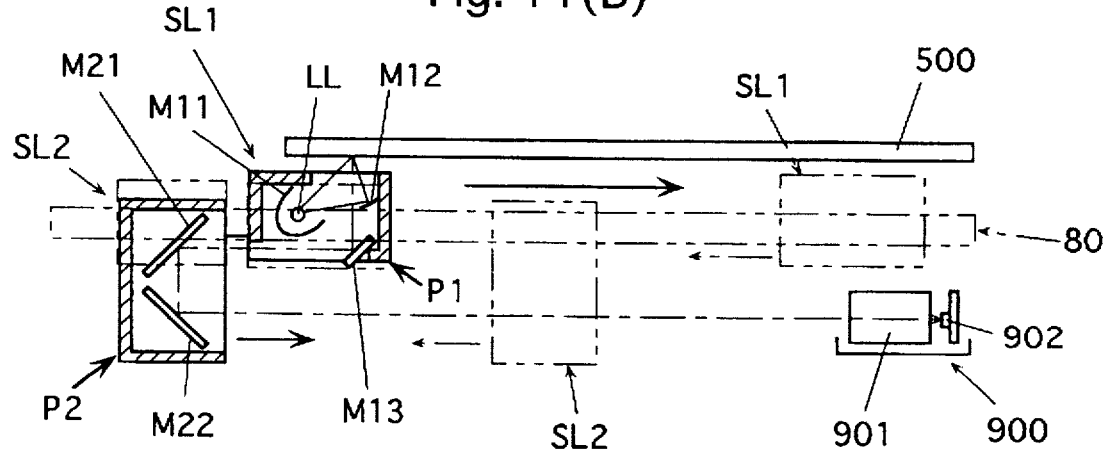
FIG. 11(B) is a schematic side view of the image reading apparatus shown in FIG. 11(A) with a certain part cut away.

Then, an image reading apparatus according to the invention will be described below. FIG. 11(A) is a schematic plan of the image reading apparatus, and FIG. 11(B) is a schematic side view of the apparatus with a certain part cut away. In FIG. 11(A), a document table glass is not shown.

Figure 14:
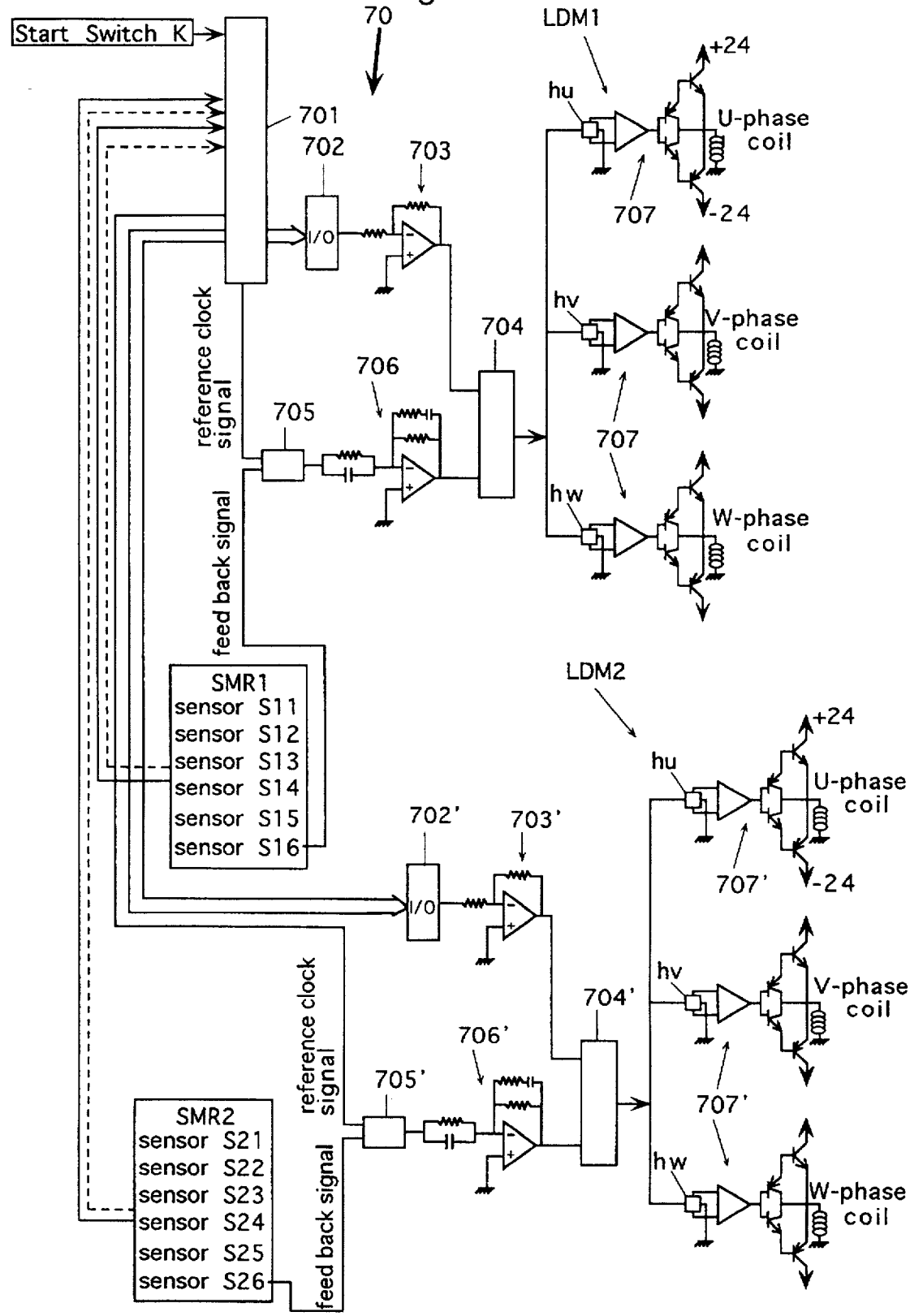
FIG. 14 is a circuit diagram of a controller of a linear motor in the image reading apparatus shown in FIG. 11(A)

This image reading apparatus includes a document table glass 500, first and second sliders SL1 and SL2 each of which is reciprocatable along a rod-like stator 80 and a guide rail GL arranged under the document table glass 500, a reading unit 900 and a controller 70 (see FIG. 14).

The first slider SL1 carries a lighting lamp LL for lighting a document laid on the document table glass 500, reflection mirrors M11 and M12 for directing the light emitted from the lighting lamp LL toward a document, and a reflection mirror M13 for leading the reflect light coming from the document toward the second slider SL2.

The first slider SL1 has a certain width in a direction perpendicular to its moving direction. An end of the first slider SL1 is fixed to a movable piece yoke Y1 of a movable piece ME1, and the other end carries a carrier roller Rr1 which can travel on the guide rail GL parallel to the stator 80.

The movable piece ME1 is a component of a linear motor LDM1 which is driving means for the first slider SL1. The linear motor LDM1 includes the stator 80 as its component. The movable piece ME1 is fitted around the stator 80 for reciprocation.

Similarly to the first slider SL1, the second slider SL2 has a certain width in a direction perpendicular to its moving direction. An end of the second slider SL2 is fixed to a movable piece yoke Y2 of a movable piece ME2, and the other end carries a carrier roller Rr2 which can travel on the guide rail GL parallel to the stator 80. The movable piece ME2 is a component of a linear motor LDM2 which is driving means for the second slider SL2. The movable piece ME2 is fitted around the stator 80 for reciprocation, which is commonly used by the motor LDM1.

The stator 80 commonly used by both the motors includes a rod-like member of a circular section which is made of a machinable and magnetizable material and has a smooth surface, and also includes a drive field magnet 801 and a magnetic scale 802 formed at the rod-like member. The stator 80 is parallel to the document table glass 500.

Figure 12A:
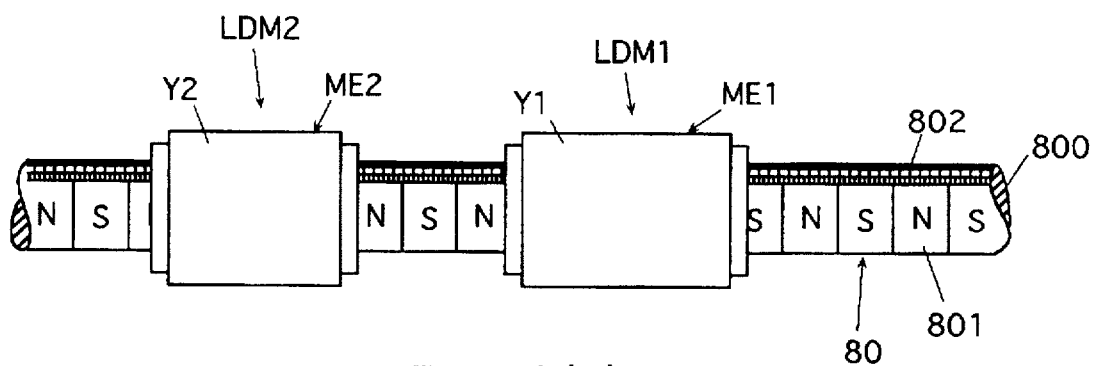
FIG. 12(A) is a side view of linear motors forming first and second slider driving means in the image reading apparatus shown in FIG. 11(A)
Figure 12B:
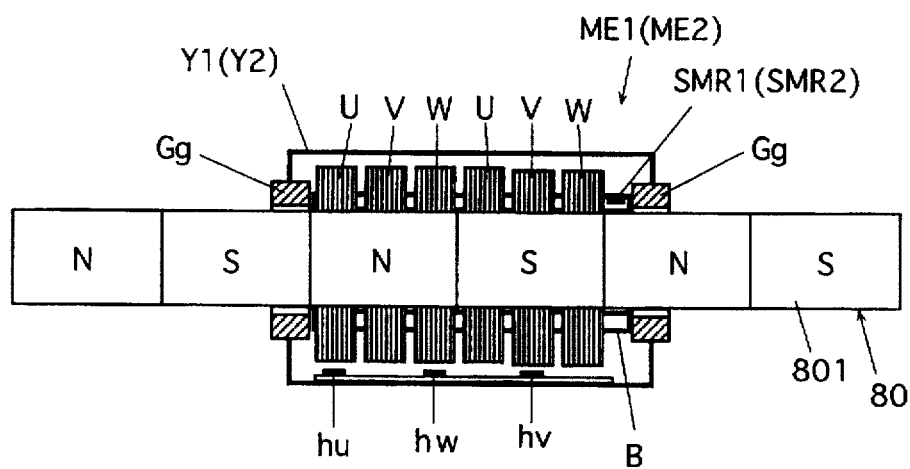
FIG. 12(B) is a cross section of the motor shown in FIG. 12(A)
Figure 12C:
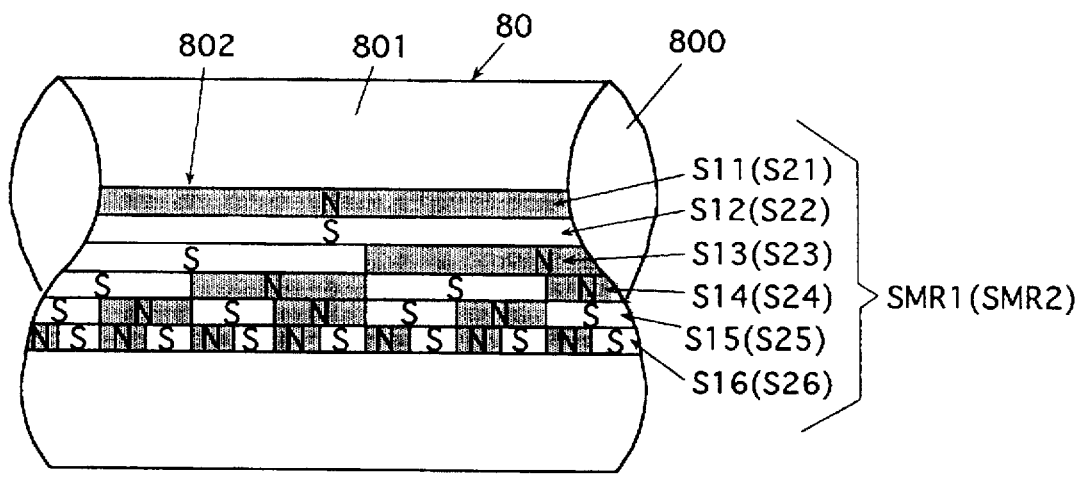
FIG. 12(C) is a plan showing, on an enlarged scale, a magnetic scale on a stator of the linear motor shown in FIG. 12(A)
Figure 13:
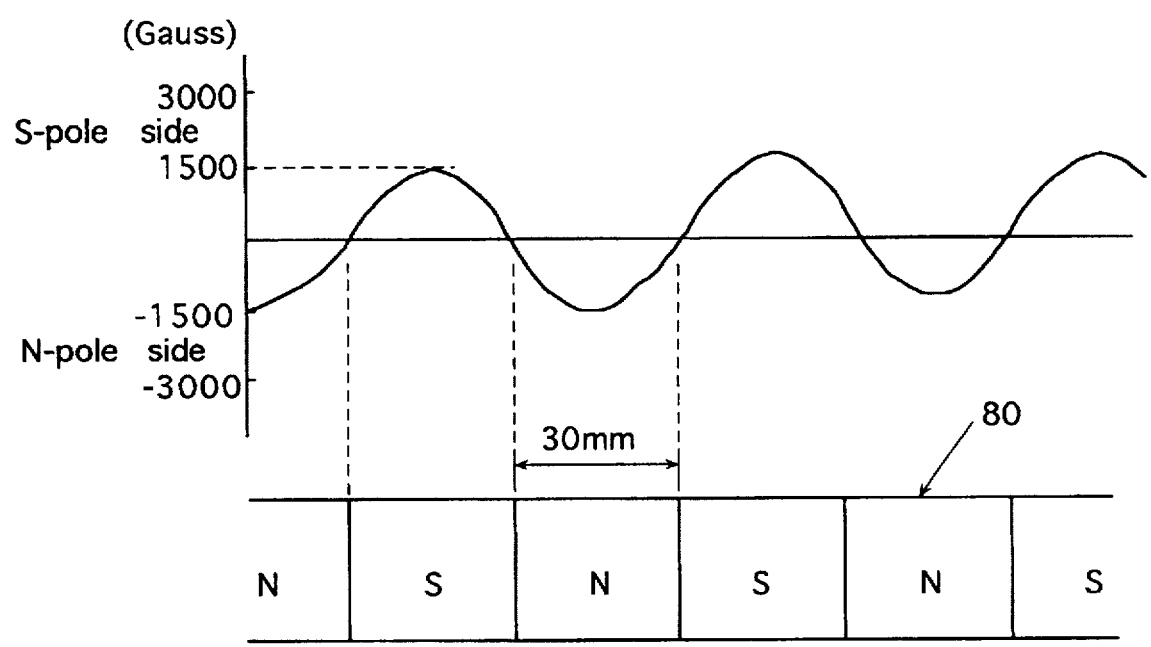
FIG. 13 shows a magnetic pole pitch and a magnetic force distribution of a field magnet on a stator.

As shown in FIGS. 12(A) to 12(C), the field magnet 801 is formed by magnetizing the surface of the rod-like member 800 to arrange N- and S-poles alternately in the longitudinal direction of the member 800 at a pitch of 30 mm, and provides a magnetic force distribution which exhibits a sinusoidal curve of a peak of 1500 Gauss and a cycle of 60 mm. The magnetic scale 802 is formed of several rows of N- and S-poles which are formed by magnetization at the surface of the rod-like member 800 and are arranged alternately to each other in the longitudinal direction of the rod-like member 800 at a fine pitch. This magnetic scale will be described later further in detail.

The movable pieces ME1 and ME2 of the motors LDM1 and LDM2 have the basically same structure, although a slight difference in size and others exist. As shown in FIG. 12(B), the movable piece ME1 (ME2) includes a coil bobbin B which is fitted around the stator 80 and can reciprocate along the stator. The three-phase armature coils u, v and w formed of U-phase coil (u), V-phase coil (v) and W-phase coil (w) are arranged around the bobbin. These coils are covered with the movable piece yoke Y1 (Y2). These armature coils are arranged at positions shifted from each other by an electrical angle of 2π/3 (or positions of the same phases as the positions shifted by 2π/3) to perform the motor operation in the three-phase drive manner. At the opposite ends of the coil bobbin B and the movable piece yoke Y1 (Y2), there are arranged annular guide members Gg fitted around the stator 80. At an inner surface of the movable piece yoke Y1 (Y2), there are arranged sensors which sense positions with respect to the field magnet 801 for controlling current supply to the respective coils in accordance with the positions so as to produce a movable piece drive force regardless of the position of the movable piece. As these sensors, this embodiment employs the Hall element hu serving as the position sensing element for the U-phase coil, the Hall element hv for the V-phase coil, and the Hall element hw for the W-phase coil.

At the coil bobbin B, there is arranged a magnetic sensor group which reads magnetic information from the magnetic scale 802. More specifically, the motor LDM1 includes a magnetic sensor group SMR1, and the motor LDM2 includes a magnetic sensor group SMR2.

In the motor LDM1, a magnetic absolute linear encoder is formed of the magnetic scale 802 and the magnetic sensor group SMR1. In the motor LDM2, a magnetic absolute linear encoder is formed of the common magnetic scale 802 and the magnetic sensor group SMR2. These encoders are provided for sensing an absolute position of the movable piece ME1 (ME2) on the stator 80, i.e., an absolute position of the slider SL1 (SL2). However, the most finely magnetized magnet row in the magnetic scale 802 is used also for speed control of the movable piece ME1 (ME2), as will be described later. This most finely magnetized portion has a magnet pole pitch of 200 μm.

As shown in FIG. 12(C), the magnetic scale 802 is formed of a plurality of rows of N- and S-poles formed by fine magnetization and arranged alternately to each other in the longitudinal direction of the stator. The magnetic pole pitch and magnetic force distribution (exhibiting a sinusoidal curve) in each fine magnet row are different from those of the other fine magnet rows. In the illustrated embodiment, a half cycle of the magnet row in the first row (at the upper end in FIG. 12(C)) is equal to the cycle of the second magnet row, which is equal to double the cycle of the third row. More specifically, assuming that there are arranged n (six in this embodiment) magnet rows, information of $2^n$ bits is held for representing an address (absolute position) of the movable piece (and thus slider).

The sensor group SMR1 (SMR2) for reading the magnetic information from the magnetic scale 802 is formed of sensors S11–S16 (S21–S26) utilizing magnetic resistance elements called an MR element, as shown in FIG. 12(C), although not restricted to this structure. The sensors S11–S16 form the sensor group SMR1 on the motor LDM1, and the sensors S21–S26 form the sensor group SMR2 on the motor LDM2. In each motor, these sensors are aligned in one row perpendicular to the longitudinal direction of the stator 80, and are attached to the movable piece such that each sensor is opposed to one of the magnet row at the magnetic scale 802.

Each magnetic sensor senses a change (sinusoidal wave) of the magnetism issued from S- and N-poles, which occurs in accordance with movement of the movable piece. By converting this into a square wave and thus into a digital signal, N-pole is represented by "1", and S-pole is represented by "0" in this embodiment. Also, six magnetic sensors are used for the six magnet rows. Thereby, address information of 6 bits can be obtained. The address information output from the respective magnetic sensors is supplied to signal input ports of a computer 701 in the controller 70.

The most finely magnetized fine magnet row in the magnetic scale 802 and the sensor S16 (S26) reading the magnetic information therefrom serve also as an encoder for the speed control of movable piece ME1 (ME2) and, in other words, the slider SL1 (SL2) coupled to the movable piece, as will be described later.

In the linear motors LDM1 and LDM2 described above, the driving forces are generated by supplying a current to the armature coils of the movable pieces ME1 and ME2 under the control of the controller 70, so that the movable pieces ME1 and ME2 are driven along the stator 80, whereby the sliders SL1 and SL2 are driven.

In this image reading apparatus, the home positions (initial positions) of the first and second sliders SL1 and SL2 are the same as the positions of the sliders shown by solid line in FIG. 11(B), respectively.

The reading unit 900 shown in FIGS. 11(A) and 11(B) includes a lens 901 and a camera element, i.e., CCD 902. The lens 901 focuses image light lead by reflection mirrors M21 and M22 on the second slider SL2 upon the CCD 902. The reading unit 900 is fixed at the image reading apparatus by an unillustrated carrying unit or member.

As shown in FIG. 14, the controller 70 includes the computer 701 which instructs predetermined operations to the motors LDM1 and LDM2 and issues the reference clock signal to phase synchronous controllers 705 and 705', and also includes I/O ports 702 and 702' for the computer 701, amplifiers 703 and 703', switching portions 704 and 704', the phase synchronous controllers 705 and 705', compensation circuits 706 and 706', and amplifier circuits 707 and 707'.

According to the control circuit shown in FIG. 14, the computer 701 supplies the reference clock signal corresponding to an intended speed to the phase synchronous controllers 705 and 705', and the encoders including the magnetic sensors S16 and S26 feed back the moving speed signals of the movable pieces ME1 and ME2 to the controllers 705 and 705'. The phase synchronous controllers 705 and 705' issue signals corresponding to differences in the frequency and phase between the pulse of the reference clock signal and the pulses of the feedback signal sent from the encoders. The compensation circuits 706 and 706' compensate a gain or delay in the transmission system, and the output voltages thereof are used as the reference input voltages of the Hall elements. Each Hall element issues a voltage corresponding to a magnitude and direction of the magnetic flux at the position thereof, and the output voltage has such a characteristic that it is proportional to the reference input voltage. Therefore, the Hall element issues the output voltage corresponding to the difference between the reference clock signal and the feedback signal. The output voltages issued from the Hall elements are proportionally amplified by the amplifier circuits 707 and 707' to supply a current to the armature coils. In this manner, the feedback signal can have the pulse of the same frequency and phase as those of the pulse of the reference clock signal, and, in other words, the motors LDM1 and LDM2 are driven to attain intended speeds of the movable pieces ME1 and ME2. During the image scanning, a ratio of 2:1 is maintained between the speeds of the sliders SL1 and SL2.

Figure 15:
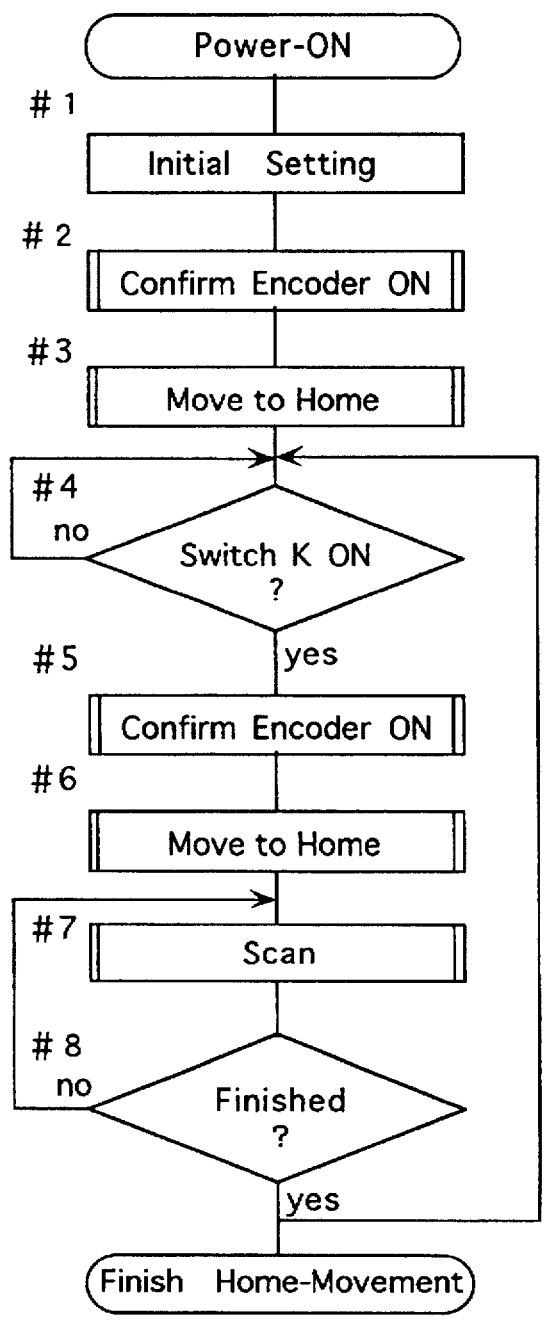
FIG. 15 is a flowchart of processing by the controller of the image reading apparatus shown in FIG. 11(A)
Figure 16:
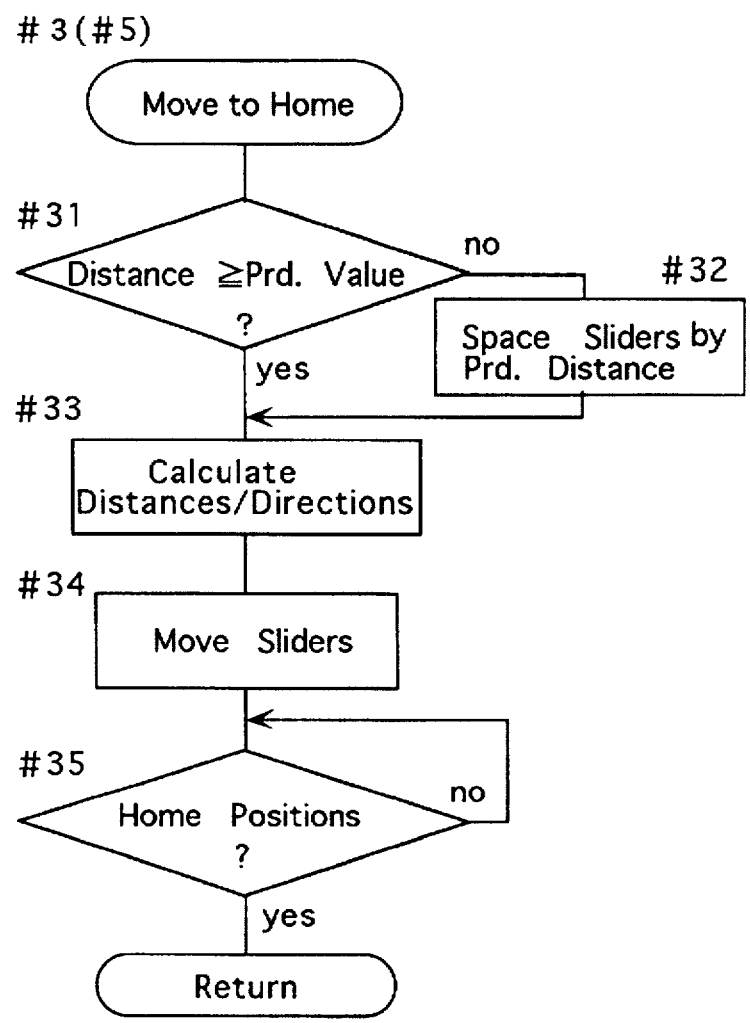
FIG. 16 is a flow chart showing contents of processing in the flow chart shown in FIG. 15 for moving first and second sliders to home positions.

Description will now be given on an operation of the image reading apparatus according to the invention, and particularly an operation of returning the first and second sliders SL1 and SL2 to the initial positions with reference to flow charts of FIGS. 15 and 16 showing contents of processing by the computer 701 of the controller 70.

When a machine (e.g., a digital copying machine) provided with the image reading apparatus is powered on, initial setting of a CPU (Central Processing Unit) and others is first performed (#1 in FIG. 15), and then it is determined whether the encoders are turned on or not (#2 in FIG. 15). This determination of the turn-on of the encoders is performed by determining whether or not the signals sent from the respective sensor groups SMR1 and SMR2 forming the encoders are received via the determination signal input port of the computer 701 as shown in FIG. 14 by dotted lines. Then, the respective sliders SL1 and SL2 are returned to their home positions (initial positions) P1 and P2 (see FIG. 11(B)) at #3 in FIG. 15. This operation is performed as follows. If a distance between the sliders SL1 and SL2 calculated from the positions of the sliders sensed by the encoders is not larger than a predetermined value, both the sliders are relatively moved to space them from each other by a predetermined distance (#31 and #32 in FIG. 16). On the conditions that the distance between the sliders is larger than the predetermined value, the direction and distance which the sliders must move are calculated based on the current absolute positions of the sliders thus sensed (#33 in FIG. 16), and the sliders SL1 and SL2 are moved at the same speed in the same direction to the home positions P1 and P2 based on results of the above calculation, respectively (#34 and #35 in FIG. 16). When a copy start switch K (see FIG. 14) on a control panel of the copying machine is subsequently turned on (#4 in FIG. 15), turn-on of the encoders are confirmed again, the operation of returning the respective sliders to the home positions is executed in accordance with the same procedures as the flow chart in FIG. 16 (#5 and #6 in FIG. 15), and the document image is scanned (#7 in FIG. 15). This document image scanning is performed by a usual scanning operation with a set speed (set magnification) and is repeated, if necessary, multiple times corresponding to the number of required copied sheets (#7 and #8 in FIG. 15).

As described above, even if each of the sliders SL1 and SL2 is not located at the home position at the time of power-on or turn-on of the copy start switch K, it will be once returned to the home position. Further, this return is performed as follows. The absolute encoders sense the current absolute positions of these sliders. Subsequently, or after spacing the sliders by a predetermined distance or more, the direction and distance which each slider must move are calculated based on the sensed position, and the above return is performed based on the calculated results. Therefore, both the sliders can return to the home positions (initial positions) without a possibility of collision.

Figure 17A:
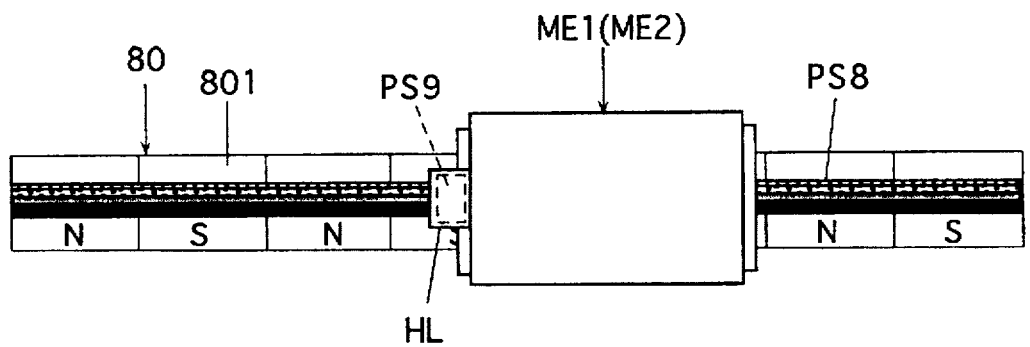
FIG. 17(A) is a side view of a linear motor provided with an optical encoder.
Figure 17B:
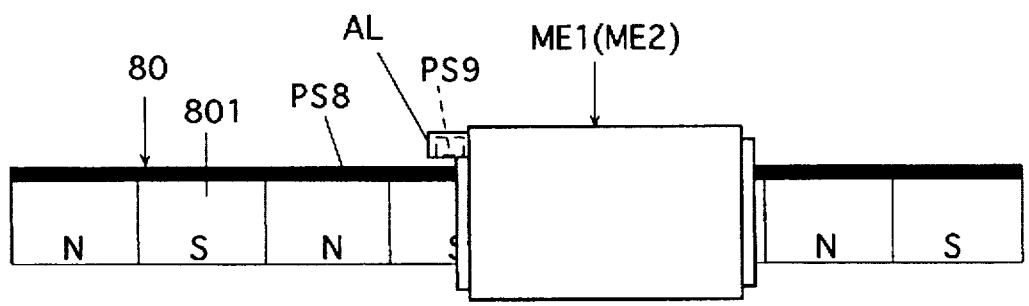
FIG. 17(B) is a plan of the same.

Although each of the encoders in the image reading apparatuses described above is a magnetic encoder, an optical encoder may be employed instead of the same. If the optical encoders are employed, an optical scale is employed instead of the magnetic scale 802 on the stator 80, and optical sensor groups are employed instead of the magnetic sensor groups SMR1 and SMR2 on the movable piece ME1 (ME2). In this case, as shown in FIGS. 17(A) and 17(B), the optical scale is formed of a group PS8 of a plurality of scales providing optical information at different cycles in order to form an absolute encoder. An optical sensor forming an optical sensor group PS9 of each movable piece is provided for each scale. The optical sensor group PS9 of each movable piece ME1 (ME2) is opposed to the scale group PS8, for example, by arranging the same at a member HL cantilevered by the movable piece.

Figure 17C:
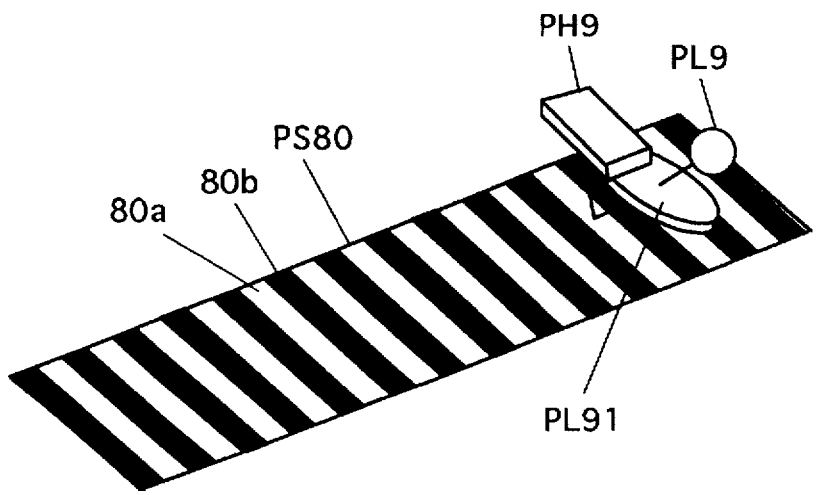
FIG. 17(C) shows an example of a principle of an optical encoder.

A principle of an example of the optical encoder will be described below with reference to FIG. 17(C). Light emitted from a light source PL9 is collimated by a lens PL91 to project the same to an optical scale PS80, and light reflected by the scale PS80 is received by a photocell PH9. High and low values of the intensity of the light received by the photocell PH9 define a pitch of the scale. The light source PL9 and lens PL91 may be carried by the carrying member HL.

The scale PS80 is provided with portions 80a of a high light reflectance and portions 80b of a low light reflectance which are alternately arranged by machining the stator material. The optical scale is not restricted to this.

Generally, the optical encoder scale may typically have a structure in which two kinds of portions providing different light reflecting states are alternately arranged. These two kinds of portions may be selected from various kinds of portions such as two kinds of portions having high and low light reflectances, and more specifically may be selected from the followings.

(1) Concavities and convexities providing different light reflecting states (e.g., convexities and concavities of different light reflectances, or convexities and concavities of different light reflecting directions). In this case, repetitive arrangement of the concavities and convexities may exhibit a sinusoidal wave form or a triangular wave form.

(2) Two kinds of portions having surface roughnesses adjusted to provide different light reflecting states.

(3) Two kinds of portions covered with films which are formed by printing, paint coating or the like to provide different light reflecting states (e.g., two kinds of portions providing different light reflectances or refractivities, or dark and light portions).

A scale member such as a film, sheet or plate, which is provided with the portions selected from the above items (1), (2) and (3) in a repetitive fashion, may be attached onto the field magnet, e.g., by adhesive. If the optical scale is directly formed at the portion having the field magnet by machining or the like, the scale can be arranged with a high precision. If the scale is arranged at a later step in this manner, combination of the field magnet and the scale pitch can be selected from a wide range.

In any case, the scale reading sensor corresponding to the optical scale described above may include a photo-sensor such as a photocell which senses reflected light coming from the scale and a light source projecting light to the scale. In this scale reading sensor, high and low values of the light intensity of the received light define a pitch of the scale.

In the structure employing the optical encoder described above, the determination of turn-on of the encoder at the steps #2 and #5 in the flow chart in FIG. 15 can be performed utilizing input of a signal from a light receiving element after power-on of the light source.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motor comprising:

a rod-like stator formed of a magnetizable rod-like member provided by magnetization with both a drive field magnet and a plurality of magnet portions providing multiple kinds of position information; and a movable piece being movable along said stator and having an armature coil opposed to said field magnet and a sensor reading the position information from said plurality of magnet portions.

2. A linear motor according to claim 1, wherein said plurality of magnet portions for providing said position information includes a fine magnet portion used for drive control of said movable piece, and a magnet portion indicating a home position of said movable piece.

3. A linear motor according to claim 1, wherein said field magnet exhibits a magnetic force distribution producing a weak or no magnetic force at a portion provided with said plurality of magnet portions for providing said position information in said stator.

4. A linear motor according to claim 3, wherein said field magnet exhibits the magnetic force distribution producing a maximum magnetic force at a portion opposite to the portion provided with said plurality of magnet portions for providing said position information in said stator.

5. An image reading apparatus comprising:

a rod-like stator including a magnetizable rod-like member provided by magnetization with both a drive field magnet and a plurality of magnet portions providing multiple kinds of position information;

first and second movable pieces each being movable along said stator, and each having an armature coil opposed to said field magnet and a sensor for reading the position information from said plurality of magnet portions;

a first slider for scanning a document image, which is coupled to said first movable piece; and a second slider coupled to said second movable piece for cooperating with said first slider for scanning the document image.

6. An image reading apparatus according to claim 5, wherein said first slider carries a lamp for lighting the document on a document table and a mirror reflecting, in a predetermined direction, image light coming from said document, and said second slider carries a mirror for reflecting, in a predetermined direction, the image light coming from the mirror on said first slider.

7. An image reading apparatus according to claim 5, wherein said plurality of magnet portions at said stator for providing said position information includes:

a fine magnet portion used for drive control of said first slider;

a fine magnet portion used for drive control of said second slider;

a magnet portion indicating a home position of said first slider; and a magnet portion indicating a home position of said second slider.

8. An image reading apparatus according to claim 7, wherein said plurality of magnet portions at said stator for providing said position information further includes a magnet portion indicating a return position of said first slider, and a magnet portion indicating a return position of said second slider.

9. An image reading apparatus according to claim 5, wherein said plurality of magnet portions formed at said stator for providing said position information include:

a fine magnet portion used for drive control of said first slider;

a fine magnet portion used for drive control of said second slider;

a magnet portion indicating a return position of said first slider; and a magnet portion indicating a return position of said second slider.

10. A linear motor according to claim 5, wherein said field magnet exhibits a magnetic force distribution producing a weak or no magnetic force at a portion provided with said plurality of magnet portions for providing said position information in said strator.

11. A linear motor according to claim 10, wherein said field magnet exhibits the magnetic force distribution producing a maximum magnetic force at a portion opposite to the portion provided with said plurality of magnet portions for providing said position information in said stator.

12. A linear motor comprising:

a rod-like stator having a drive field magnet; and a movable piece including an armature coil fitted around said stator, wherein said stator has a stepped portion at the surface of its portion provided with said field magnet, and said movable piece has a sensor disposed near said stepped portion for reading a signal from said stator.

13. A linear motor according to claim 12, wherein said stepped portion has a form of a groove, and at least a portion of said sensor on said movable piece is fitted into said groove.

14. A linear motor according to claim 12, wherein said stepped portion has a fine magnet portion forming a portion of a magnetic encoder, and said sensor on said movable piece is provided for reading a magnetic signal from said fine magnet portion.

15. A linear motor according to claim 14, wherein said fine magnet portion at said stepped portion is formed at said field magnet in an overlapped manner.

16. A linear motor according to claim 12, wherein a portion of said stator other than said stepped portion is provided with a fine magnet portion forming a portion of a magnetic encoder.

17. A linear motor according to claim 16, wherein said sensor on said movable piece is operable to read a magnetic signal from said field magnet.

18. A linear motor according to claim 12, further comprising a carrying member carrying said stator, wherein said carrying member is provided with a hole of a section similar in configuration to the section of said stator, and said stator is inserted into said hole.

19. An image reading apparatus comprising:

a first slider being reciprocatable and carrying a first mirror reflecting, in a predetermined direction, image light coming from a document;

a second slider being reciprocatable in the same direction as said first slider and carrying a second mirror leading, in a predetermined direction, the image light coming from said first mirror;

a first motor for reciprocating said first slider;

a second motor for reciprocating said second slider;

a first absolute encoder for sensing a current position of said first slider;

a second absolute encoder for sensing a current position of said second slider; and control means for controlling said first and second motors to move said first and second sliders to their initial positions without mutual collision based on the current positions of said sliders sensed by said encoders, respectively, upon start of supply of a power from a power source to the apparatus.

20. An image reading apparatus comprising:

a first slider being reciprocatable and carrying a first mirror reflecting, in a predetermined direction, image light coming from a document;

a second slider being reciprocatable in the same direction as said first slider and carrying a second mirror leading, in a predetermined direction, the image light coming from said first mirror;

a first motor for reciprocating said first slider;

a second motor for reciprocating said second slider;

a first scale;

a first encoder for sensing a current position of said first slider using the first scale;

a second scale;

a second encoder for sensing a current position of said second slider using the second scale; and control means for controlling said first and second motors to move said first and second sliders to their initial positions without mutual collision based on the current positions of said slider sensed by said encoders, respectively, upon start of supply of a power from a power source to the apparatus.

21. An image reading apparatus according to claim 20, wherein the first scale and the second scale are coordinated such that the first slider moves at twice the velocity of the second slider.

22. A linear motor according to claim 1, wherein the plurality of magnet portions is distinct from the drive field magnet.

* * * * *